United States Patent
Takagi et al.

(10) Patent No.: US 8,420,020 B2
(45) Date of Patent: Apr. 16, 2013

(54) HONEYCOMB FILTER AND METHOD FOR MANUFACTURING HONEYCOMB FILTER

(75) Inventors: Tomoyuki Takagi, Kasugai (JP); Takashi Mizutani, Tokoname (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/292,890

(22) Filed: Nov. 9, 2011

(65) Prior Publication Data

US 2012/0058020 A1    Mar. 8, 2012

Related U.S. Application Data

(63) Continuation of application No. PCT/JP2011/058081, filed on Mar. 30, 2011.

(30) Foreign Application Priority Data

Mar. 31, 2010 (JP) ................ 2010-081903

(51) Int. Cl.
*B01D 50/00* (2006.01)
(52) U.S. Cl.
USPC ........................................... 422/180
(58) Field of Classification Search .............. 422/177, 422/180
See application file for complete search history.

(56) References Cited

U.S. PATENT DOCUMENTS

| 7,718,143 B2 | 5/2010 | Ogura |
| 2006/0142153 A1 | 6/2006 | Endo et al. |

FOREIGN PATENT DOCUMENTS

| JP | 01-304022 A1 | 12/1989 |
| JP | 06-033734 A1 | 2/1994 |
| JP | 2002-177794 A1 | 6/2002 |
| JP | 2003154223 A * | 5/2003 |
| JP | 2004-216226 A1 | 8/2004 |
| JP | 2006-175386 A1 | 7/2006 |
| JP | 2006-189027 A1 | 7/2006 |

* cited by examiner

*Primary Examiner* — Tom Duong
(74) *Attorney, Agent, or Firm* — Burr & Brown

(57) ABSTRACT

A honeycomb filter includes a plurality of porous partition portions each forming a cell, which is open at one end and closed at the other end and serves as an exhaust gas flow path, and a trapping layer, for trapping and removing solid components contained in the exhaust gas, formed on each of the partition portions. At least part of each of the partition portions is loaded with a catalyst. The amount of catalyst a (g/L) in an upstream partition portion and the amount of catalyst b (g/L) in a downstream partition portion satisfy $1.05 \leq a/b \leq 3.00$. A method for, limiting a/b to this range includes the entire honeycomb structure, including the partition portions, into contact with a catalyst component to form a catalyst, and subsequently bringing only an upstream region of the honeycomb structure into contact with a catalyst component to form a catalyst.

4 Claims, 10 Drawing Sheets

HONEYCOMB FILTER AND METHOD FOR MANUFACTURING HONEYCOMB FILTER

BACKGROUND OF THE INVENTION

The present invention relates to a honeycomb filter and a method for manufacturing the honeycomb filter.

DESCRIPTION OF RELATED ART

One proposed honeycomb filter includes a porous partition portion forming cells. The cells that are open at one end and closed at the other end and cells that are closed at one end and open at the other end are alternately disposed. The honeycomb filter further includes a layer for trapping and removing particulate matter (PM) contained in an exhaust gas formed on the partition portion (see, for example, Patent Documents 1 to 3). Such a honeycomb filter can trap PM by the trapping layer with low pressure loss.

[Patent Document 1] Japanese Unexamined Patent Application Publication No. 2004-216226
[Patent Document 2] Japanese Unexamined Patent Application Publication No. 6-33734
[Patent Document 3] Japanese Unexamined Patent Application Publication No. 1-304022

SUMMARY OF THE INVENTION

In such a honeycomb filter, for example, trapped PM may be burnt to restore the function of the filter ("regeneration treatment"), and a catalyst may be loaded on the honeycomb filter to promote PM combustion. Furthermore, for example, an oxidation catalyst for promoting the oxidation of HCs, CO, and the like in an exhaust gas may be loaded on the honeycomb filter to remove them by oxidation. The exhaust gas purification efficiency can increase with increasing amount of catalyst. Furthermore, the temperature of the honeycomb filter can be increased by increasing the heat of the oxidation reaction to promote PM combustion, or the activity of the catalyst can be increased to increase the exhaust gas purification efficiency. However, a large amount of catalyst may block the pores of a partition portion and an exhaust gas flow and thereby increases pressure loss. Thus, it is desirable to improve the purification efficiency and the temperature rise performance of a honeycomb filter without increasing pressure loss.

In view of the situations described above, it is a principal object of the present invention to provide a honeycomb filter that has improved purification efficiency and temperature rise performance without an increase in pressure loss and a method for manufacturing the honeycomb filter.

In order to achieve the principal object, the present invention has employed the following means.

A honeycomb filter according to one aspect of the present invention includes:

a plurality of porous partition portions each forming a cell that is open at one end and closed at the other end and serves as a flow path of a fluid, at least part of each of the partition portions being loaded with a catalyst, and a trapping layer for trapping and removing solid components contained in the fluid, the trapping layer being disposed on each of the partition portions, wherein the amount of catalyst a in an upstream partition portion, which is formed of part of each of the partition portions on the upstream side of the cell, and the amount of catalyst b in a downstream partition portion, which is formed of part of each of the partition portions on the downstream side of the cell, satisfy $1.05 \leq a/b \leq 3.00$.

This honeycomb filter includes partition portions and trapping layers. The amount of catalyst a in an upstream partition portion and the amount of catalyst b in a downstream partition portion satisfy $1.05 \leq a/b \leq 3.00$. A honeycomb filter according to the present invention can achieve high purification efficiency and temperature rise performance without an increase in pressure loss. The possible reason for this will be described below. In general, the upstream temperature of a fluid, such as an automobile exhaust gas, is higher than the downstream temperature. The purification efficiency of a catalyst increases with the fluid temperature in a common operation range (approximately 0° C. to 200° C.). Thus, the purification efficiency increases with increasing number of contacts between the fluid and the catalyst in the upstream region. The contact between the fluid and the catalyst promotes the oxidation of unburned components and the generation of heat of oxidation. Much heat of oxidation generated in the upstream region is propagated to the downstream region and increases the temperature of the entire honeycomb filter. Thus, heat of oxidation can be utilized with a minimum of waste. This improves the temperature rise performance of the honeycomb filter. The trapping layer having an effect of decreasing pressure loss promotes a fluid flow to the partition. This can increase the number of contacts between the fluid and the catalyst in the upstream region and improve the purification efficiency and the temperature rise performance of the honeycomb filter. In such a honeycomb filter, trapped solid components may be burnt to restore the function of the filter ("regeneration treatment"). During combustion for a predetermined time, a honeycomb filter having improved temperature rise performance according to the present invention can maintain a high temperature for a long period of time. This increases the amount of solid components burnt for each regeneration treatment, thus increasing regeneration efficiency. An a/b ratio of 1.05 or more results in high purification efficiency and temperature rise performance of the honeycomb filter. An a/b ratio of 3.00 or less results in the formation of a moderate amount of catalyst on the partition portion in the upstream region, prevents the blockage of the fluid flow to the partition portion in the upstream region, and prevents deterioration in the purification efficiency and the temperature rise performance of the honeycomb filter. The term "upstream", as used herein, refers to the fluid inlet side. The term "downstream", as used herein, refers to the fluid outlet side. The phrase "the amount of catalyst in a partition portion", as used herein, refers to the amount of catalyst (% by mass) determined by elementary analysis utilizing electron microscopy. It may be the amount of catalyst per apparent unit volume (g/L) obtained by multiplying the amount of catalyst (% by mass) by the total weight of the target honeycomb filter and dividing the product by the volume of the honeycomb filter.

In this honeycomb filter, the cells may include open inlet cells, which have an open inlet and a sealed outlet, and open outlet cells, which have a sealed inlet and an open outlet, and the open inlet cells and the open outlet cells may be adjacent to each other.

In a honeycomb filter according to one aspect of the present invention, at least part of the trapping layer may be loaded with a catalyst, and the amount of catalyst A in an upstream trapping layer, which is formed of part of the trapping layer in the upstream partition portion, and the amount of catalyst B in a downstream trapping layer, which is formed of part of the trapping layer in the downstream partition portion, may satisfy $1.08 \leq A/B \leq 5.00$. This can further increase the purification efficiency of the honeycomb filter. The phrase "the amount of catalyst in a trapping layer", as used herein, refers to the amount of catalyst (% by mass) determined by elementary analysis utilizing electron microscopy. It may be the amount of catalyst per apparent unit volume (g/L) obtained by multiplying the amount of catalyst (% by mass) by the total weight of the target honeycomb filter and dividing the product by the volume of the honeycomb filter.

In a honeycomb filter according to one aspect of the present invention, at least a surface of the trapping layer on the flow path side may be loaded with a catalyst, and the following formula may be satisfied: $1.10 \leq A_s/B_s \leq 8.00$, wherein $A_s$ denotes the amount of catalyst on an upstream trapping layer surface, which is a cell surface of the upstream trapping layer, and $B_s$ denotes the amount of catalyst on a downstream trapping layer surface, which is a cell surface of the downstream trapping layer. This can improve the temperature rise performance of the honeycomb filter and increase the regeneration efficiency in the regeneration treatment. The phrase "the amount of catalyst on a trapping layer surface", as used herein, refers to the amount of catalyst (% by mass) determined by elementary analysis utilizing electron microscopy. It may be the amount of catalyst per apparent unit volume (g/L) obtained by multiplying the amount of catalyst (% by mass) by the total weight of the target honeycomb filter and dividing the product by the volume of the honeycomb filter.

In a honeycomb filter according to one aspect of the present invention, the trapping layer may be uniformly loaded with a catalyst in the thickness direction. This can also achieve high purification efficiency and temperature rise performance of the honeycomb filter without an increase in pressure loss. The phrase "uniformly loaded with a catalyst in the thickness direction", as used herein, means that the amount of catalyst in the direction perpendicular to the partition surface is uniform, and the uniformity may be completely uniform or partly uniform. For example, in the direction perpendicular to the partition surface, a difference in the amount of catalyst between a portion having the maximum amount of catalyst and a portion having the minimum amount of catalyst may be 0.2 g/L or less or 0.1 g/L or less.

In a honeycomb filter according to one aspect of the present invention, the thickness of the downstream trapping layer may be larger than the thickness of the upstream trapping layer. This is because a large thickness of the downstream trapping layer results in a large amount of fluid passing through the upstream partition portion having low permeation resistance.

In a honeycomb filter according to an aspect of the present invention, the partition portion may contain one or more inorganic materials selected from cordierite, SiC, mullite, aluminum titanate, alumina, silicon nitride, sialon, zirconium phosphate, zirconia, titania, and silica. The trapping layer may contain one or more inorganic materials selected from cordierite, SiC, mullite, aluminum titanate, alumina, silicon nitride, sialon, zirconium phosphate, zirconia, titania, and silica. Preferably, the trapping layer is formed of the material of the partition portion.

A method for manufacturing a honeycomb filter according to the present invention is
 a method for manufacturing a honeycomb filter for trapping and removing solid components contained in a fluid, including:
 a trapping layer forming step of forming a trapping layer in a honeycomb structure that includes a plurality of porous partition portions, the trapping layer being a layer for trapping and removing solid components contained in the fluid, each of the partition portions forming a cell that is open at one end and closed at the other end and serves as a flow path of a fluid;
 an entire catalyst forming step of bringing the entire honeycomb structure into contact with a catalyst component to form a catalyst; and
 a partial catalyst forming step of bringing only an upstream region of the honeycomb structure into contact with a catalyst component to form a catalyst.

In this method for manufacturing a honeycomb filter, the entire honeycomb structure is brought into contact with a catalyst component, and additionally only an upstream region is brought into contact with the catalyst component to form a catalyst. Thus, the amount of catalyst in the upstream region is larger than the amount of catalyst in the downstream region. Such a method for manufacturing a honeycomb filter according to the present invention can be used to manufacture a honeycomb filter that has high purification efficiency and temperature rise performance without an increase in pressure loss. In the method for manufacturing a honeycomb filter, it is preferred to form a catalyst such that the amount of catalyst a in an upstream partition portion, which is formed of part of each of the partition portions on the upstream side of the cell and the amount of catalyst b in a downstream partition portion, which is formed of part of each of the partition portions on the downstream side of the cell, satisfy $1.05 \leq a/b \leq 3.00$.

The entire catalyst forming step of bringing the entire honeycomb structure into contact with a catalyst component to form a catalyst may be preceded or followed by the partial catalyst forming step of bringing only an upstream region of the honeycomb structure into contact with a catalyst component to form a catalyst. The entire catalyst forming step is preferably followed by the partial catalyst forming step. The entire catalyst forming step may be preceded or followed by the trapping layer forming step. The partial catalyst forming step may be preceded or followed by the trapping layer forming step. In the case that the partial catalyst forming step is preceded by the trapping layer forming step, it is preferable that the particle size of the catalyst component is smaller than the particle size of the trapping layer and that the catalyst component passes through the trapping layer to form a catalyst on the partition portion.

A method for manufacturing a honeycomb filter according to another aspect of the present invention is
 a method for manufacturing a honeycomb filter for trapping and removing solid components contained in a fluid, including:
 a trapping layer forming step of forming a trapping layer in a honeycomb structure that includes a plurality of porous partition portions, the trapping layer being a layer for trapping and removing solid components contained in the fluid, each of the partition portions forming a cell that is open at one end and closed at the other end and serves as a flow path of a fluid;
 an upstream catalyst forming step of bringing only an upstream region of the honeycomb structure into contact with a catalyst component to form a catalyst, and
 a downstream catalyst forming step of bringing only a downstream region of the honeycomb structure into contact with a catalyst component to form a catalyst, the catalyst component having a lower concentration than the catalyst component for the upstream region.

In this method for manufacturing a honeycomb filter, the upstream region of the honeycomb structure is brought into contact with a high concentration of catalyst to form a catalyst component, and the downstream region is brought into contact with a low concentration of catalyst to form a catalyst component. Also in this manner, the amount of catalyst loading in the upstream region can be larger than the amount of catalyst loading in the downstream region. The upstream catalyst forming step of bringing only the upstream region into contact with a catalyst component to form a catalyst may be preceded or followed by the downstream catalyst forming step of bringing only the downstream region into contact with a catalyst component to form a catalyst. The upstream catalyst forming step may be preceded or followed by the trapping layer forming step. The downstream catalyst forming step may be preceded or followed by the trapping layer forming step. In the case that the upstream catalyst forming step is preceded by the trapping layer forming step, it is preferable that the particle size of the catalyst component is smaller than the particle size of the trapping layer and that the catalyst component passes through the trapping layer to form a catalyst on the partition portion.

DETAILED DESCRIPTION OF THE INVENTION

Embodiments of the present invention will be described below with reference to the accompanying drawings. A honeycomb filter according to the present invention may be installed in a gas exhaust pipe to purify an exhaust gas from an automobile engine. The honeycomb filter can trap and remove solid components (particulate matter, hereinafter also referred to as PM) contained in the exhaust gas. In this honeycomb filter, when the amount of trapped PM has reached a predetermined value, the fuel concentration is increased to burn the trapped PM (regeneration treatment).

Figure 1:
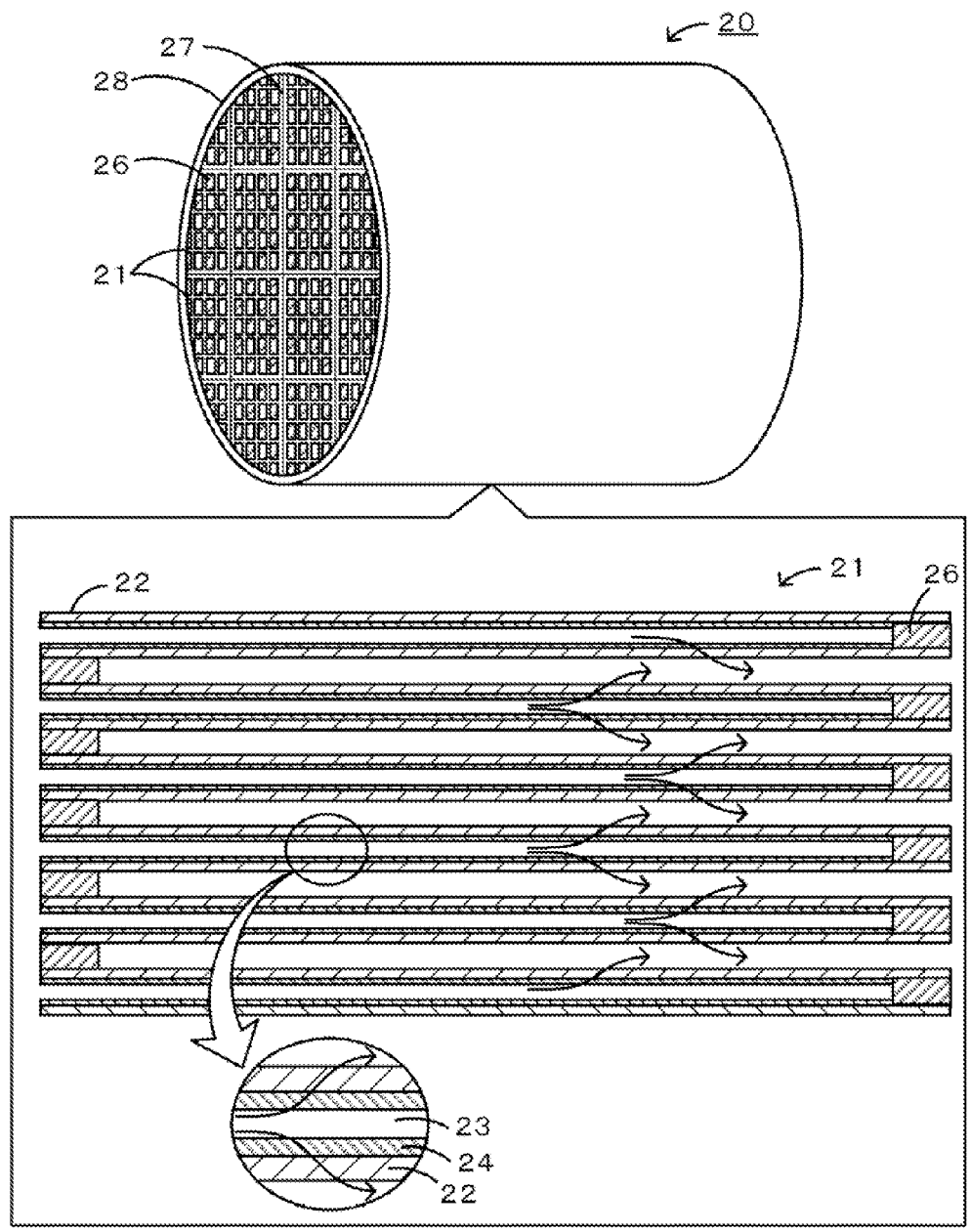
FIG. 1 is an explanatory view of a honeycomb filter 20.
Figure 2:
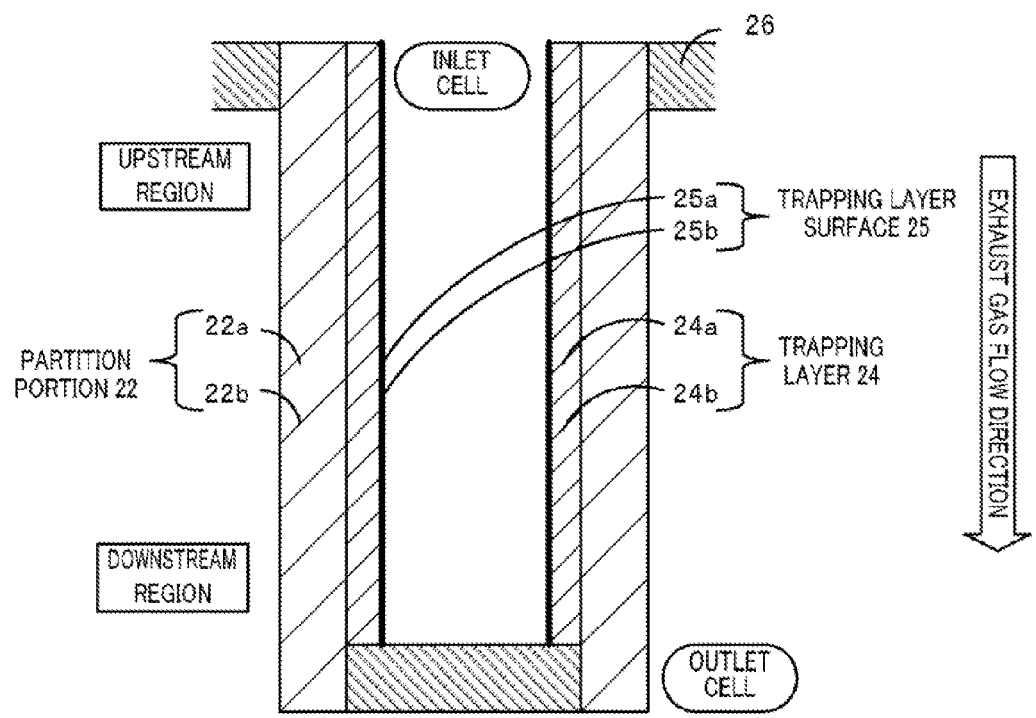
FIG. 2 is an explanatory view of a longitudinal section of a honeycomb segment 21.
Figure 3:
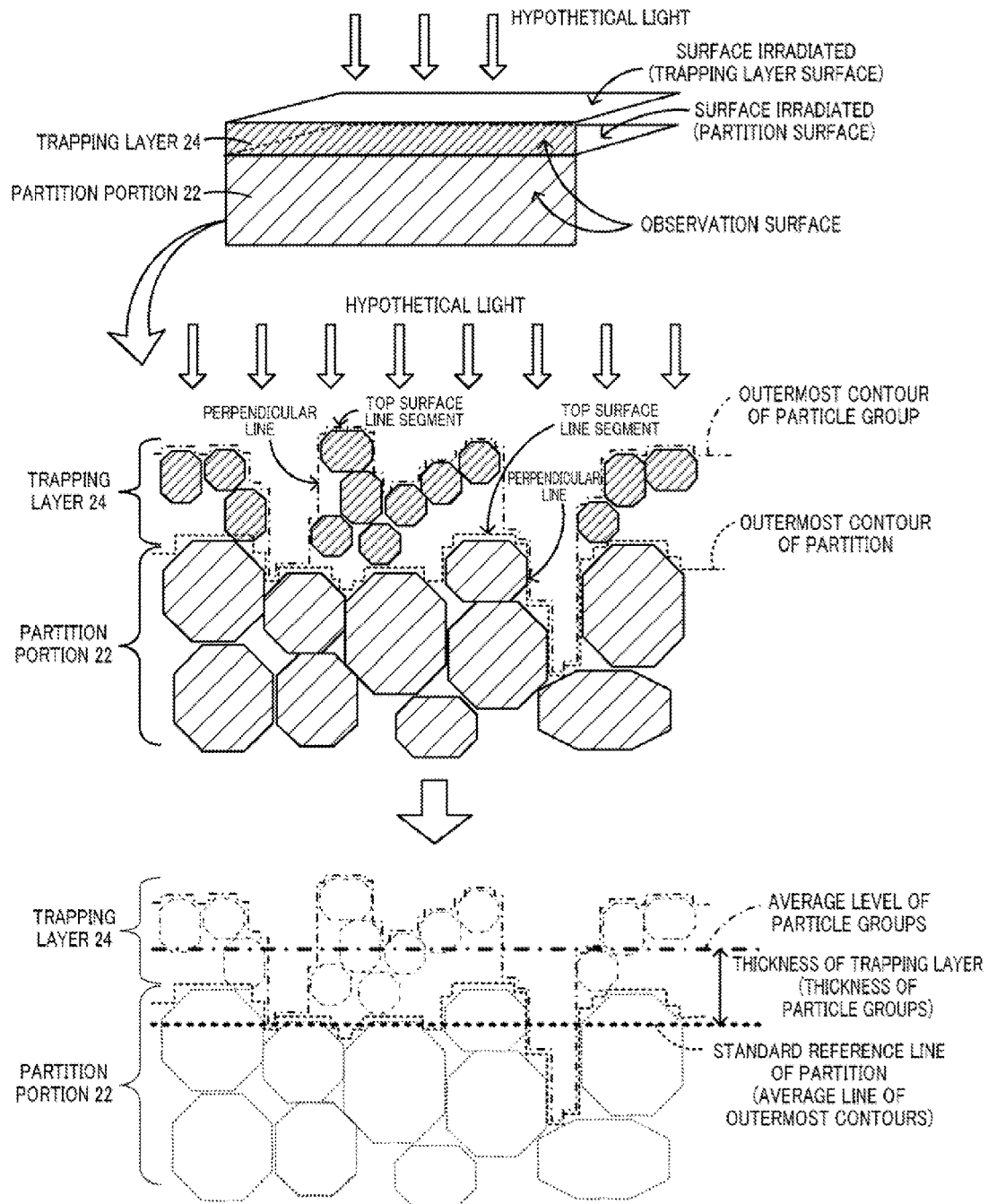
FIG. 3 is an explanatory view of a method for calculating the thickness of a trapping layer on the basis of SEM observation.
Figure 4:
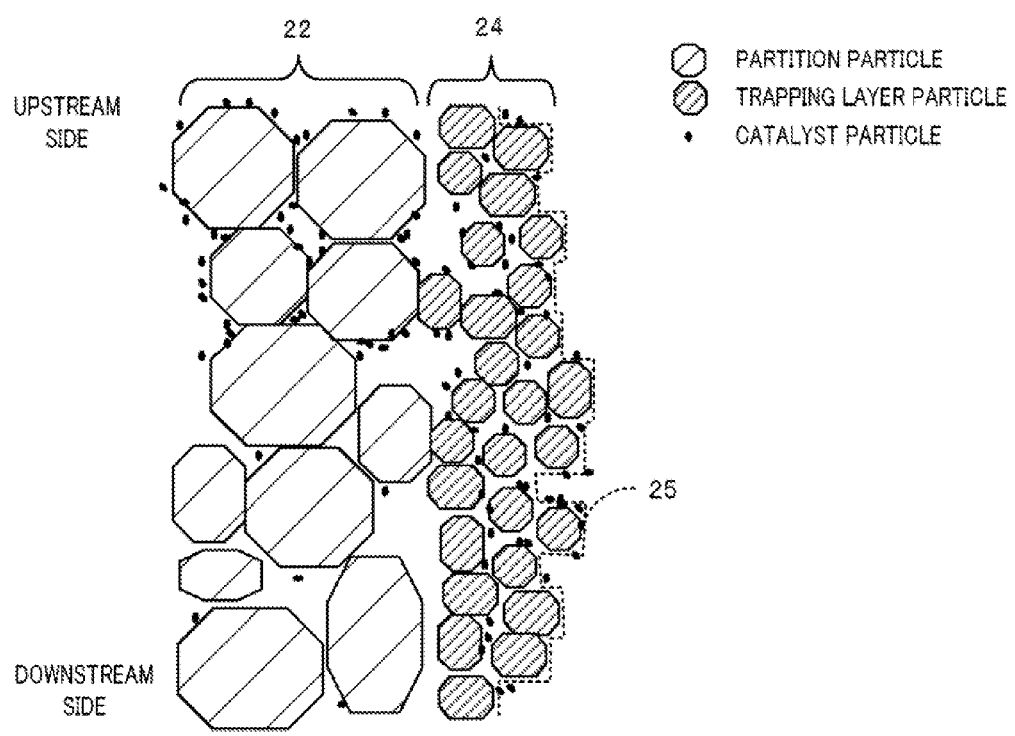
FIG. 4 is a schematic view of the catalyst distribution of the honeycomb filter 20.
Figure 5:
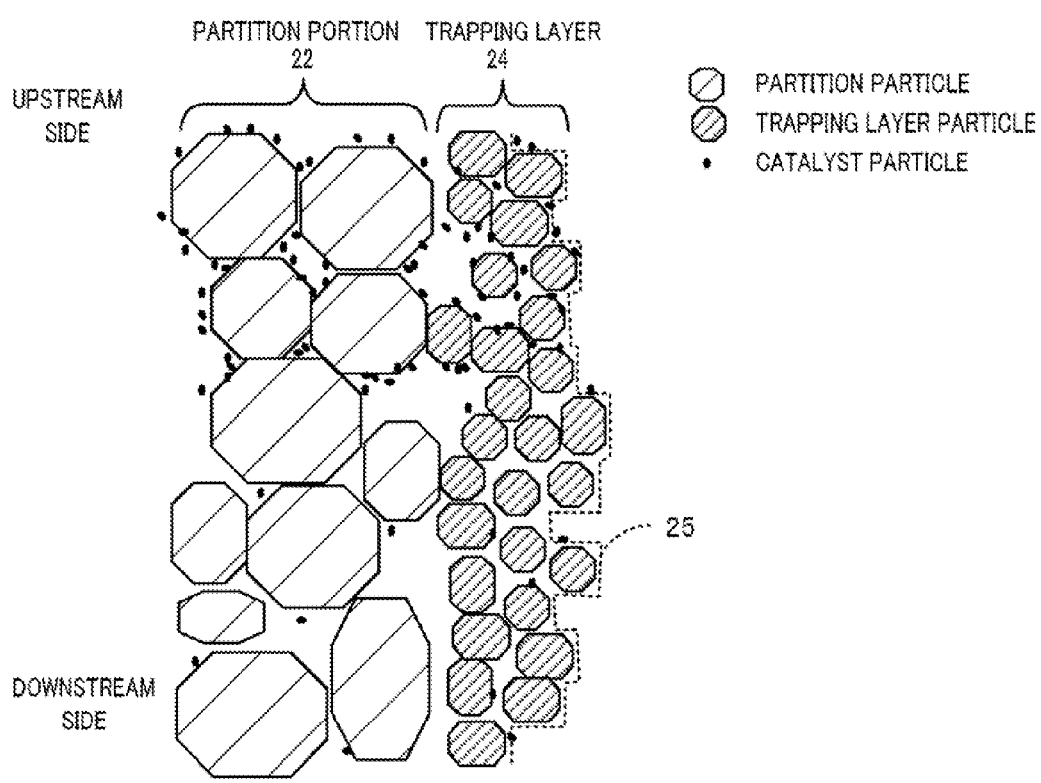
FIG. 5 is a schematic view of the catalyst distribution of the honeycomb filter 20.
Figure 6:
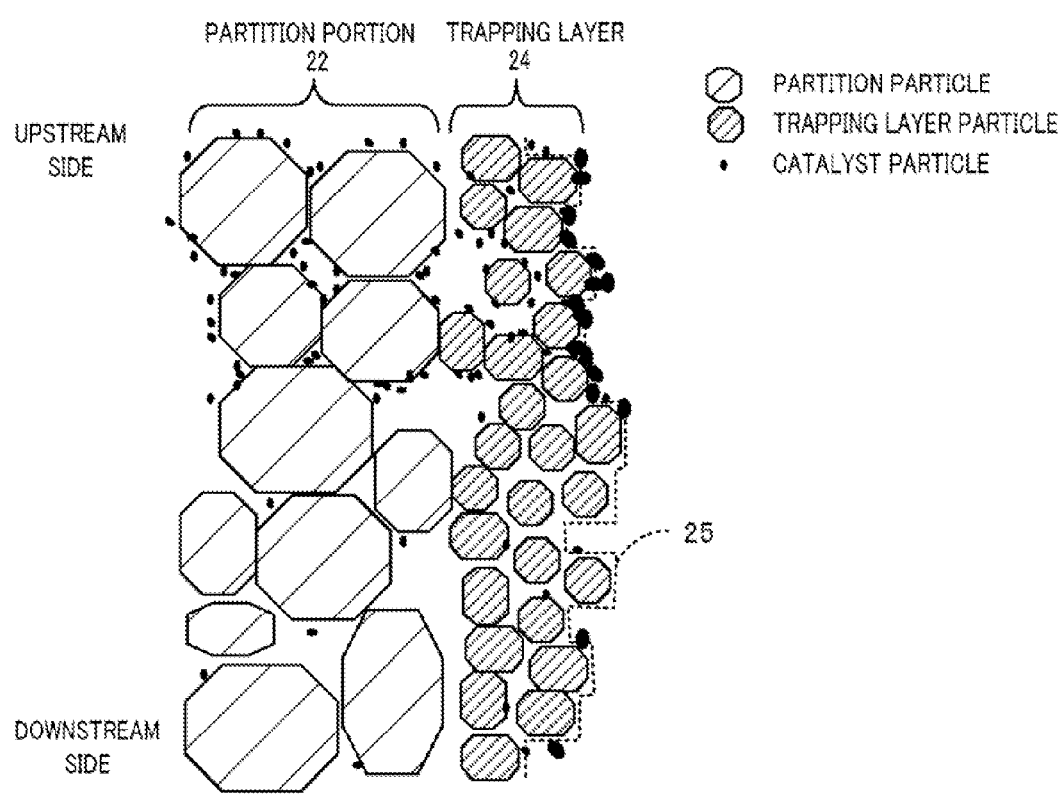
FIG. 6 is a schematic view of the catalyst distribution of the honeycomb filter 20.
Figure 7:
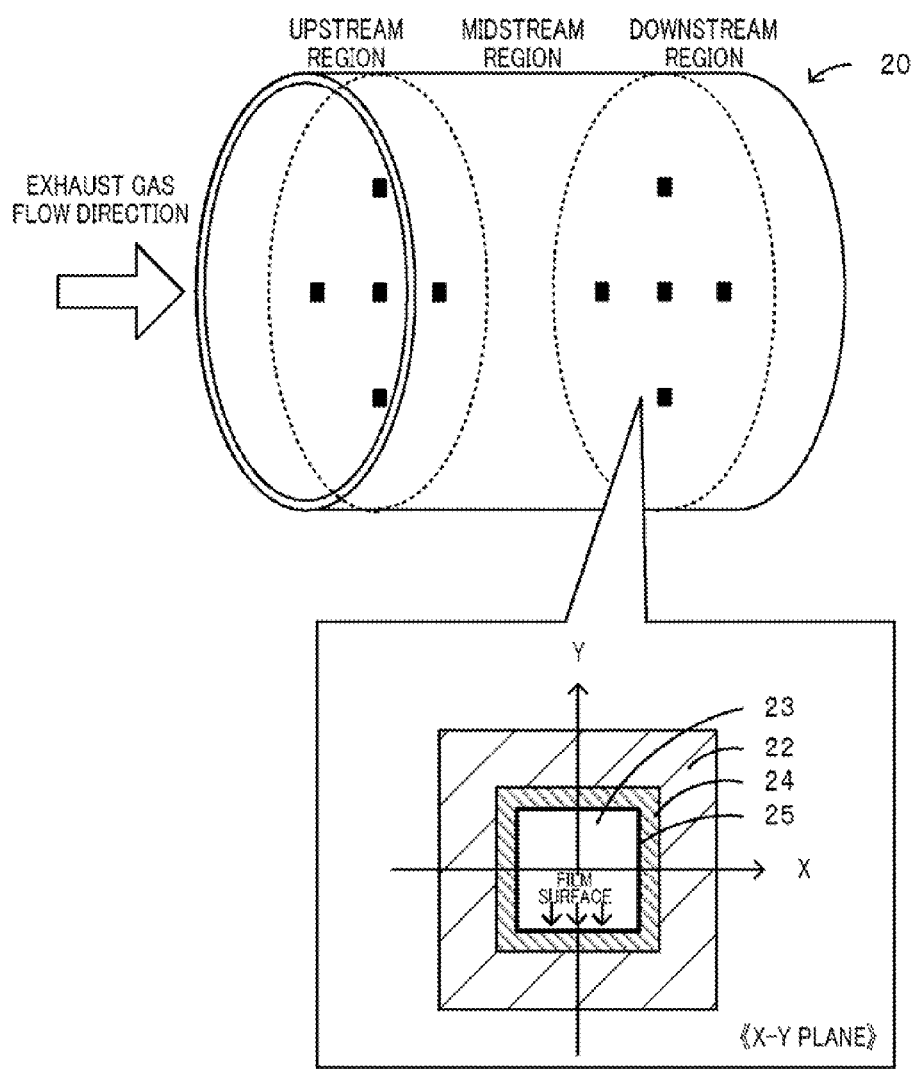
FIG. 7 is an explanatory view of the measuring points for the amount of catalyst.
Figure 8:
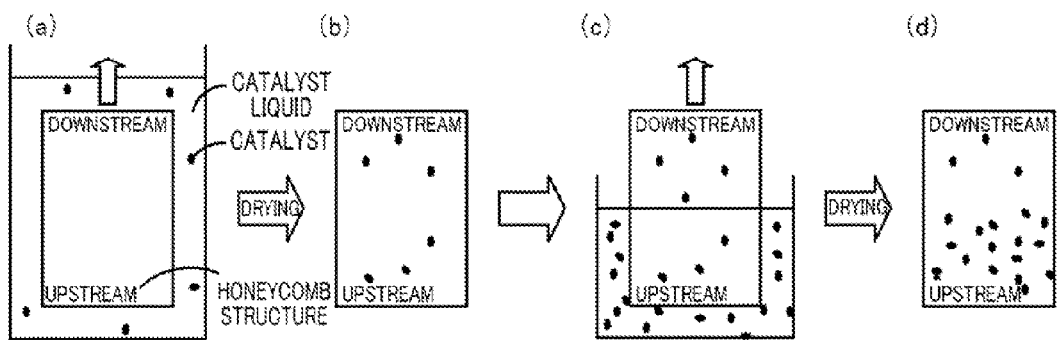
FIG. 8 is an explanatory view of a method for manufacturing the honeycomb filter 20.
Figure 9:
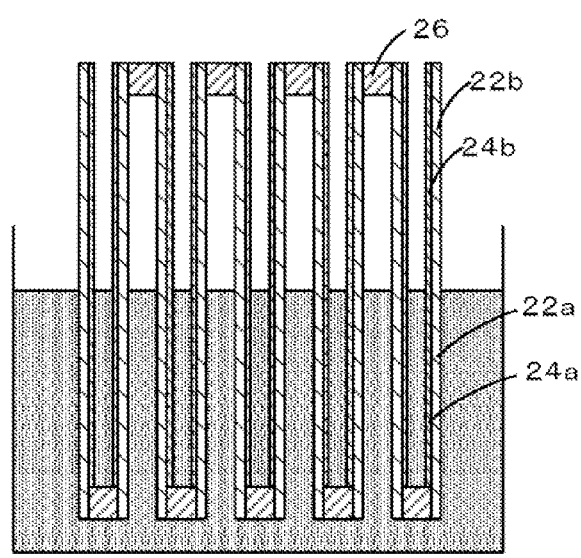
FIG. 9 is an explanatory view of the upstream region of the honeycomb filter 20 brought into contact with a catalyst component.

A honeycomb filter according to one embodiment of the present invention will be described below with reference to the drawings. FIG. 1 is an explanatory view of a honeycomb filter 20 according to an embodiment of the present invention. FIG. 2 is an explanatory view of a longitudinal section of a honeycomb segment 21. FIG. 3 is an explanatory view of a method for calculating the thickness of a trapping layer on the basis of SEM observation. FIGS. 4 to 6 are schematic views of the catalyst distribution of the honeycomb filter 20. An explanatory view of a honeycomb filter 40 according to an embodiment of the present invention. FIG. 7 is an explanatory view of the measuring points for the amount of catalyst. FIG. 8 is an explanatory view of a method for manufacturing the honeycomb filter 20. FIG. 9 is an explanatory view of the upstream region of the honeycomb filter 20 brought into contact with a catalyst component.

In the honeycomb filter 20 according to the present embodiment as illustrated in FIG. 1, the outer surfaces of two or more honeycomb segments 21, each of which includes a partition portion 22, are joined together with a bonding layer 27, and an outer protective portion 28 is disposed around the honeycomb segments 21. The honeycomb filter 20 includes a porous partition portion 22 constituting each of a plurality of cells 23, each of the cells being open at one end and sealed with a sealing portion 26 at the other end and serving as an exhaust gas flow path, and a trapping layer 24 for trapping and removing solid components (PM) contained in a fluid (exhaust gas), the trapping layer being disposed on the partition portion 22. In the honeycomb filter 20, the partition portion 22 is formed such that a cell 23 that is open at one end and closed at the other end and a cell 23 that is closed at one end and open at the other end are alternately disposed. In the honeycomb filter 20, an exhaust gas enters a cell 23 having an opening on the inlet side (hereinafter also referred to as an inlet cell), passes through the trapping layer 24 and the partition portion 22, and is exhausted from another cell 23 having an opening on the outlet side (hereinafter also referred to as an outlet cell), during which PM in the exhaust gas is trapped on the trapping layer 24.

The honeycomb filter 20 may have any external shape and may be cylindrical, quadrangular prismatic, cylindroid, or hexagonal columnar. The honeycomb segments 21 may have any external shape, preferably have a plane that is easy to join, and may have a square columnar (quadrangular prismatic, hexagonal columnar, or the like) cross section. The cross section of the cell may be polygonal, such as triangular, tetragonal, hexagonal, or octagonal, circular, or streamlined, such as elliptical, or combination thereof. For example, the cell 23 may have a tetragonal cross section perpendicular to the exhaust gas flow direction. In the present embodiment, in principle, the honeycomb filter 20 is cylindrical, each of the honeycomb segments 21 is rectangular columnar, and a cell 23 is rectangular.

The honeycomb filter 20 preferably has a cell pitch of 1.0 mm or more and 2.5 mm or less. The pressure loss during PM deposition decreases with increasing filtration area. The initial pressure loss increases with decreasing cell diameter. Thus, the cell pitch, the cell density, and the thickness of the partition portion 22 may be determined in consideration of trade-offs between initial pressure loss, pressure loss during PM deposition, and PM trapping efficiency.

The partition portion 22 is porous and may contain one or more inorganic materials selected from cordierite, Si-bonded SiC, recrystallized SiC, aluminum titanate, mullite, silicon nitride, sialon, zirconium phosphate, zirconia, titania, alumina, and silica. Among these, cordierite, Si-bonded SiC, and recrystallized SiC are preferred. The partition portion 22 preferably has a porosity of 30% by volume or more and 85% by volume or less, more preferably 35% by volume or more and 65% by volume or less. The partition portion 22 preferably has an average pore size of 10 µm or more and 60 µm or less. The porosity and the average pore size are measured by a mercury intrusion method. The partition portion 22 preferably has a thickness of 150 µm or more and 600 µm or less, more preferably 200 µm or more and 400 µm or less. A thickness of 150 µm or more results in high mechanical strength, and a thickness of 600 µm or less results in low pressure loss. The partition portion 22 having such a porosity, an average pore size, and a thickness allows an exhaust gas to easily pass through the partition portion 22 and PM to be easily trapped and removed.

The trapping layer 24 for trapping and removing PM contained in an exhaust gas may be formed of particle groups, having an average particle size smaller than the average pore size of the partition portion 22 and may be disposed on the partition portion 22. In the trapping layer 24, the average pore size is preferably 0.2 µm or more and 10 µm or less, the porosity is preferably 40 by volume or more and 95% by volume or less, and the average size of particles constituting the trapping layer is preferably 0.5 µm or more and 15 µm or less. An average pore size of 0.2 µm or more results in the prevention of an excessive initial pressure loss in the absence of PM deposition. An average pore size of 10 µm or less results in an improvement in PM trapping efficiency, the prevention of PM entering the pore through the trapping layer 24, and the prevention of the increase in pressure loss during PM deposition. A porosity of 40% by volume or more results in the prevention of an excessive initial pressure loss in the absence of PM deposition. A porosity of 95% by volume or less results in the formation of a surface layer serving as a durable trapping layer 24. When the average size of particles constituting the trapping layer is 0.5 µm or more, a space between the particles constituting the trapping layer can be sufficiently provided, thus ensuring high permeability of the trapping layer and preventing a sudden increase in pressure loss. When the average size of particles constituting the trapping layer is 15 µm or less, there are a sufficient number of points of contact between the particles, ensuring a sufficient bond strength between the particles and a high peel strength of the trapping layer. Thus, it is possible to maintain high PM trapping efficiency, prevent a sudden increase in pressure loss immediately after the start of PM trapping, decrease pressure loss during PM deposition, and impart durability to the trapping layer. The trapping layer 24 preferably has an average thickness of 10 µm or more and 80 µm or less. At a trapping layer thickness of 10 µm or more, it is easy to trap PM. A trapping layer thickness of 80 µm or less results in a decreas in the permeation resistance of a partition and a decrease in pressure loss. The average thickness of the trapping layer is preferably 20 µm or more and 60 µm or less, more preferably 30 µm or more and 50 µm or less. The trapping layer traps PM and prevents the PM from entering the partition portion 22. This can prevent the poisoning of one of the catalysts described below supported by the partition portion 22, for example, by direct contact with PM containing sulfur.

The trapping layer 24 may be formed on the partition portion 22 of each of the exhaust gas inlet and outlet cells. As illustrated in FIG. 1, preferably, the trapping layer 24 is formed on the partition portion 22 of the inlet cell and is not formed on the partition portion 22 of the outlet cell. This allows PM contained in a fluid to be efficiently removed with low pressure loss. Furthermore, this facilitates the manufacture of the honeycomb filter 20. In a honeycomb filter according to one embodiment of the present invention, the thickness of a downstream trapping layer 24b is larger than the thickness of an upstream trapping layer 24a. This is because a large thickness of the downstream trapping layer 24b results in a large amount of fluid passing through the upstream partition portion having low permeation resistance. This is also because a large thickness of the downstream trapping layer 24b results in a decrease in the amount of catalyst component entering the downstream partition portion during catalyst loading, making it easy to increase the amount of catalyst in the upstream region. This is also because a large thickness of the downstream trapping layer 24b results in a decrease in the amount of PM entering the downstream partition portion 22b, thus preventing the poisoning of a small amount of catalyst contained in the downstream partition portion by contact with the PM. The trapping layer 24 may contain one or more inorganic materials selected from cordierite, SiC, mullite, aluminum titanate, alumina, silicon nitride, sialon, zirconium phosphate, zirconia, titania, and silica. Preferably, the trapping layer 24 is formed of the material of the partition portion 22. More preferably, the trapping layer 24 contains 70% by weight or more ceramic or metallic inorganic fiber. The fiber facilitates PM trapping. The inorganic fiber of the trapping layer 24 may contain one or more materials selected from aluminosilicate, alumina, silica, zirconia, ceria, and mullite. The average particle size of the particle groups constituting the trapping layer 24 is a mean value measured by observing the trapping layer 24 with a scanning electron microscope (SEM) and measuring the individual particles of the trapping layer 24 in the images obtained. The average size of raw material particles is the median size (D50) measured with a laser diffraction/scattering particle size distribution analyzer using water as a dispersion medium.

The trapping layer 24 may be formed on the cell 23 using a slurry containing inorganic particles serving as the raw material of the trapping layer 24. Alternatively, a fine powder of inorganic particles serving as the raw material of the trapping layer 24 may be introduced into a cell with a gas to form the trapping layer 24 on the surface of the cell 23. The inorganic particles may be made of the inorganic material described above and preferably has an average size smaller than the average pore size of the partition.

A method for measuring the thickness of the trapping layer 24 will be described below with reference to FIG. 3. The thickness of the trapping layer 24, in other words, the thickness of the particle groups constituting the trapping layer is determined in the following manner. The thickness of the trapping layer is determined by embedding a partition substrate of the honeycomb filter 20 in a resin and polishing the resin to prepare a sample for observation, performing scanning electron microscope (SEM) observation, and analyzing the images obtained. First, the sample for observation is prepared by cutting and polishing such that a cross section perpendicular to the fluid flow direction serves as an observation surface. The observation surface of the sample for observation prepared is photographed at measuring points described below in a visual field of approximately 500 µm×500 µm at a SEM magnification in the range of 100 to 500. The outermost contour of a partition is then hypothetically drawn on the images obtained. The outermost contour of a partition is a line showing the outline of the partition and refers to a projector obtained by irradiating a partition surface (a surface to be irradiated; see the top in FIG. 3) with hypothetical parallel light in the direction perpendicular to the partition surface (see the middle in FIG. 3). The outermost contour of a partition is composed of line segments corresponding to a plurality of top surfaces of the partition at different levels irradiated with hypothetical light and perpendicular lines each connecting line segments corresponding to adjacent top surfaces of the partition at different levels. The line segments corresponding to the top surfaces of the partition are drawn at "5% resolution", in which, for example, asperities having a length of 5 µm or less are disregarded with respect to a line segment having a length of 100 µm. This prevents the occurrence of too many line segments in the horizontal direction. In the drawing of the outermost contour of a partition, the presence of a trapping layer is disregarded. Subsequently, in the same manner as in the outermost contour of a partition, the outermost contour of the particle groups constituting a trapping layer is hypothetically drawn. The outermost contour of the particle groups is a line showing the outline of the trapping layer and refers to a projector obtained by irradiating a trapping layer surface (a surface to be irradiated; see the top in FIG. 3) with hypothetical parallel light in the direction perpendicular to the trapping layer surface (see the middle in FIG. 3). The outermost contour of the particle groups is composed of line segments corresponding to a plurality of top surfaces of the particle groups at different levels irradiated with hypothetical light and perpendicular lines each connecting line segments corresponding to adjacent top surfaces of the particle groups at different levels. The line segments corresponding to the top surfaces of the particle groups are drawn, for example, at the same "resolution" as in the partition. For a porous trapping layer, in a sample for observation prepared by embedding in a resin and polishing, some particle groups are observed as if they floated in the air. The outermost contour is therefore drawn with the projector obtained by hypothetical parallel light irradiation. Subsequently, the standard reference line of the partition is determined on the basis of the levels and lengths of the line segments of the outermost contour corresponding to the top surfaces of the partition thus drawn. The standard reference line is the average line of the outermost contour of the partition (see the bottom in FIG. 3). In the same manner as in the standard reference line of the partition, the average level of the particle groups is determined on the basis of the levels and lengths of the line segments of the outermost contour corresponding to the top surfaces of the particle groups thus drawn. The average level of the particle groups is the average line of the outermost contour of the particle groups (see the bottom in FIG. 3). The difference (length) between the average level of the particle groups and the standard reference line of the partition is considered to be the thickness of the trapping layer (the thickness of the particle groups) in the image. In this manner, the thickness of a trapping layer can be determined.

The average pore size and the porosity of the trapping layer 24 are determined by image analysis based on SEM observation. In the same manner as in the thickness of the trapping layer, as illustrated in FIG. 3, images of a cross section of the honeycomb filter 20 are obtained with SEM. A region between the outermost contour of a partition and the outermost contour of particle groups is considered to be a region occupied by a trapping layer (a trapping layer region). In the trapping layer region, a region including the particle groups is referred to as a "particle group region", and a region including no particle group is referred to as a "pore region of the trapping layer". The area of the trapping layer region (trapping layer area) and the area of the particle group region (particle group area) are determined. The porosity of the trapping layer is calculated by dividing the particle group area by the trapping layer area and multiplying the quotient by 100. In the "pore region of the trapping layer", an incircle inscribed in the outermost contours of the particle groups and the partition and the periphery of the particle groups is drawn so that the diameter of the incircle is as large as possible. In the case that a plurality of incircles can be drawn in one "pore region of the trapping layer", for example, in the case of a rectangular pore region having a large aspect ratio, a plurality of incircles as large as possible are drawn such that the pore region is sufficiently filled with the incircles. In the image observation area, the average diameter of the incircles is considered to be the average pore size of the trapping layer. In this manner, the average pore size and the porosity of the trapping layer 24 can be determined.

In the honeycomb filter 20, the partition portion 22 contains a catalyst. The trapping layer 24 may contain a catalyst. The catalyst may be at least one of catalysts for oxidizing unburned gases (HCs, CO, and the like) contained in an exhaust gas, catalysts for promoting the combustion of trapped PM, and catalysts for occluding/adsorbing/decomposing NOx. The catalyst can increase the efficiency of oxidizing unburned gases, removing PM, or decomposing NOx. The catalyst more preferably contains at least one of noble metal elements and transition metal elements. The honeycomb filter 20 may be loaded with another catalyst or a purification material. Among those are a NOx storage catalyst containing an alkali metal (such as Li, Na, K, or Cs) or an alkaline-earth metal (such as Ca, Ba, or Sr), at least one rare-earth metal, a transition metal, a three-way catalyst, a promoter exemplified by cerium (Ce) and/or zirconium (Zr) oxide, or a hydrocarbon (HC) adsorbent. More specifically, examples of the noble metal include platinum (Pt), palladium (Pd), rhodium (Rh), gold (Au), and silver (Ag). Examples of the transition metal contained in the catalyst include Mn, Fe, Co, Ni, Cu, Zn, Sc, Ti, V, and Cr. Examples of the rare-earth metal include Sm, Gd, Nd, Y, La, and Pr. Examples of the alkaline-earth metal include Mg, Ca, Sr, and Ba. Among these, platinum and palladium are more preferred. The noble metal, the transition metal, or the promoter may be supported by a carrier having a large specific surface area. Examples of the carrier include alumina, silica, silica alumina, and zeolite. The honeycomb filter 20 containing a catalyst for promoting PM combustion can more easily remove PM trapped on the trapping layer 24. The honeycomb filter 20 containing a catalyst for oxidizing unburned gases or a catalyst for decomposing NOx can more highly purify an exhaust gas. The catalyst in the partition portion 22 may be uniformly loaded in the thickness direction. The catalyst in the trapping layer 24 may be uniformly loaded in the thickness direction. The phrase "uniformly loaded with a catalyst in the thickness direction", as used herein, means that the amount of catalyst in the direction perpendicular to the partition surface is uniform, and the uniformity may be completely uniform or partly uniform. For example, in the direction perpendicular to the partition surface, a difference in the amount of catalyst between a portion having the maximum amount of catalyst and a portion having the minimum amount of catalyst may be 0.2 g/L or less or 0.1 g/L or less.

In the partition portion 22, the amount of catalyst a in an upstream partition portion 22a, which is formed of part of each of the partition portions on the upstream side of the cell, and the amount of catalyst b in a downstream partition portion 22b, which is formed of part of each of the partition portions on the downstream side of the cell, satisfy $1.05 \leq a/b \leq 3.00$. This can achieve high purification efficiency and temperature rise performance of the honeycomb filter without an increase in pressure loss. The upstream partition portion 22a may be formed of one third of the partition portion 22 from the upstream end in the exhaust gas flow direction. The downstream partition portion 22b may be formed of one third of the partition portion 22 from the downstream end in the exhaust gas flow direction. More preferably, the amounts of catalyst a and b satisfy $1.5 \leq a/b \leq 3.0$. This results in higher purification efficiency and temperature rise performance of the honeycomb filter. The phrase "the amount of catalyst in a partition portion", as used herein, refers to the amount of catalyst (% by mass) determined by elementary analysis utilizing electron microscopy. It may be the amount of catalyst per apparent unit volume (g/L) obtained by multiplying the amount of catalyst by mass) by the total weight of the target honeycomb filter and dividing the product by the volume of the honeycomb filter. The grasping of the relative relationship between the amount of catalyst a and the amount of catalyst b suffices for "the amount of catalyst". The "amount of catalyst" may be the amount of specific catalyst component, for example, noble metal element, such as Pt or Pd, directly determined by elementary analysis utilizing electron microscopy. The amount of catalyst carrier, such as alumina, that is loaded with a noble metal element determined by elementary analysis utilizing electron microscopy may be indirectly used in place of the amount of noble metal element. In the case that the partition contains the element of the catalyst carrier (for example, alumina), measurements for the catalyst component (such as a noble metal) may be used to determine the relative relationship between the amount of catalyst a and the amount of catalyst b.

FIGS. 4 to 6 are schematic views of the catalyst distribution of the honeycomb filter 20 according to the present embodiment. In the honeycomb filter 20 illustrated in FIG. 4, the amount of catalyst in the upstream partition portion 22a is larger than the amount of catalyst in the downstream partition portion 22b. In the trapping layer 24 and the trapping layer surface 25, the amount of catalyst in the upstream region is comparable to the amount of catalyst in the downstream region. Thus, the trapping layer 24 may be uniformly loaded with a catalyst. The trapping layer 24 may contain no catalyst. This can also achieve high purification efficiency and temperature rise performance of the honeycomb filter without an increase in pressure loss. The phrase "uniformly loaded with a catalyst", as used herein, means that the amount of catalyst in the upstream region is comparable to the amount of catalyst in the downstream region. For example, the difference in the amount of catalyst between the upstream region and the downstream region may be 0.02 g/L or less or 0.01 g/L or less.

In the honeycomb filter 20 illustrated in FIG. 5, the amount of catalyst in the upstream partition portion 22a is larger than the amount of catalyst in the downstream partition portion 22b, the amount of catalyst in the upstream trapping layer 24a is larger than the amount of catalyst in the downstream trapping layer 24b, and the amount of catalyst in the upstream region is comparable to the amount of catalyst in the downstream region on the trapping layer surface 25. Thus, at least part of the trapping layer 24 may be loaded with a catalyst, and the amount of catalyst A in the upstream trapping layer 24a and the amount of catalyst B in the downstream trapping layer 24b preferably satisfy $1.08 \leq A/B \leq 5.00$. This results in high purification efficiency of the honeycomb filter. More preferably $1.50 \leq A/B \leq 5.00$, still more preferably $2.00 \leq A/B \leq 5.00$, is satisfied. This results in higher purification efficiency of the honeycomb filter. In this case, catalyst particles are supported by the surfaces of the particles constituting the trapping layer in the upstream region. This can increase the contact time between the exhaust gas and the catalyst, thereby improving the purification efficiency and the temperature rise performance of the honeycomb filter. The "amount of catalyst in a trapping layer" is similar to "the amount of catalyst in a partition portion", that is, the amount of catalyst supported by the trapping layer and may be the catalyst weight (g) per unit volume (L) of the honeycomb filter.

In the honeycomb filter 20 illustrated in FIG. 6, the amount of catalyst in the upstream partition portion 22a is larger than the amount of catalyst in the downstream partition portion 22b, the amount of catalyst in the upstream trapping layer 24a is larger than the amount of catalyst in the downstream trapping layer 24b, and the amount of catalyst in an upstream trapping layer surface 25a is larger than the amount of catalyst in a downstream trapping layer surface 25b. In this honeycomb filter 20, the trapping layer surface 25 is loaded with a catalyst, and the amount of catalyst $A_s$ in the upstream trapping layer surface 25a and the amount of catalyst $B_s$ in the downstream trapping layer surface 25b preferably satisfy $1.10 \leq A_s/B_s \leq 8.00$. This can improve the temperature rise performance of the honeycomb filter and increase the regeneration efficiency in the regeneration treatment. More preferably $1.50 \leq A_s/B_s \leq 8.00$, still more preferably $3.00 \leq A_s/B_s \leq 8.00$, is satisfied. This can further improve the temperature rise performance of the honeycomb filter and increase the regeneration efficiency in the regeneration treatment. In this case, an exhaust gas entering a cell comes into contact with a catalyst to generate heat of oxidation in an early stage. The heat can be propagated to increase the temperature of the entire honeycomb filter in an early stage and improve the temperature rise performance and the purification efficiency of the honeycomb filter. The "amount of catalyst in a trapping layer surface" is similar to "the amount of catalyst in a partition portion", that is, the amount of catalyst supported by the trapping layer surface and may be the catalyst weight (g) per unit volume (L) of the honeycomb filter.

As illustrated in FIGS. 4 to 6, the honeycomb filter 20 may be loaded with a catalyst. The catalyst within the trapping layer 24 or the trapping layer surface 25 is not particularly limited provided that the amounts of catalyst in the upstream partition portion 22a and the downstream partition portion 22b satisfy the relationship described above. For example, a catalyst may be absent within the trapping layer 24 and present only on the trapping layer surface 25. Alternatively, a catalyst may be absent on the trapping layer surface 25 and present only within the trapping layer 24. Furthermore, the amount of catalyst in the downstream trapping layer 24b may be larger than the amount of catalyst in the upstream trapping layer 24a, or the amount of catalyst in the downstream trapping layer 25b may be larger than the amount of catalyst on the upstream trapping layer surface 25a. The amount of catalyst may vary in the thickness direction of the partition portion or the trapping layer.

A method for measuring the amount of catalyst will be described below. As illustrated in FIG. 7, the measuring points for the amounts of catalyst a, A, and $A_s$ in the upstream region are five points including the central point and four points disposed above and below and on the left and right of the central point in a cross section disposed approximately one sixth of the total length of the honeycomb filter 20 from its upstream end face. The amount of catalyst is the average of measurements at these five points. As illustrated in FIG. 7, the measuring points for the amounts of catalyst b, B, and $B_s$ in the downstream region are five points including the central point and four points disposed above and below and on the left and right of the central point in a cross section disposed approximately one sixth of the total length of the honeycomb filter 20 from its downstream end face. The amount of catalyst is the average of measurements at these five points. The amount of catalyst is measured as described below. A test sample for measuring the amounts of catalyst a and b in the partition portion 22 and the amounts of catalyst A and B in the trapping layer 24 is prepared by cutting a partition substrate from the honeycomb filter 20 such that a measuring cross section (X-Y plane) serves as a surface to be measured, embedding the partition substrate in a resin, and polishing the resin. A test sample for the amounts of catalyst $A_s$ and $B_s$ in the trapping layer surface 25 is prepared by cutting a partition substrate from the honeycomb filter 20 such that the surface (film surface) of the trapping layer 24 serves as a surface to be measured. After scanning electron microscope (SEM) observation, the amount of catalyst is calculated by the elementary analysis of the observed region. Preferably, the SEM magnification ranges from 100 to 1000. For example, an energy dispersive X-ray spectrometer (EDX) or an electron probe microanalyzer (EPMA) can be used in the elementary analysis. The EDX measurement may involve performing scanning measurement in an observation field to obtain the concentration (% by mass) in the measured region and comparing the concentration in each measuring point to determine the relative relationship between the measuring points. Noble metal components (hereinafter also referred to as PGMs) in the catalyst may be measured. Alternatively, the amount of alumina as a carrier for a noble metal component may be considered to be the amount of catalyst corresponding to the noble metal component content. More specifically, elementary analysis is performed at 5 to 10 points in an observation field. Among the components detected, the main component of those classified as catalyst components is judged to be the catalyst carrier. The mass percent of the catalyst carrier is considered to be the amount of catalyst in the observation field. In the case of oxidation catalyst coating, if alumina is the main component of the detected catalyst components, then the amount of alumina may be considered to be the amount of catalyst. Alternatively, in the case that a catalyst component (such as Pt) can be directly measured, the mass percent of the catalyst component (such as Pt) based on the catalyst applied may be considered to be the amount of catalyst in this region. In order to determine the relative relationship between the amounts of catalyst in measuring points, for example, compare the amount of catalyst in the upstream partition portion with the amount of catalyst in the downstream partition portion, the mass percent measured with an EDX may be directly used in the comparison. It may be the amount of catalyst per apparent unit volume obtained by multiplying the mass percent by the total weight of the target honeycomb filter and dividing the product by the volume of the honeycomb filter.

The bonding layer 27 is a layer for joining the honeycomb segments 21 and may contain inorganic particles, inorganic fiber, and a binding material. The inorganic particles may be particles made of the inorganic material described above and preferably have an average size of 0.1 μm or more and 30 μm or less. The inorganic fiber may be that described above and preferably has an average diameter of 0.5 μm or more and 8 μm or less and an average length of 100 μm or more and 500 μm or less. The binding material may be colloidal silica or clay. The bonding layer 27 is preferably formed in the range of 0.5 mm or more and 2 mm or less. The average particle size is the median size (D50) measured with a laser diffraction/scattering particle size distribution analyzer using water as a dispersion medium. The outer protective portion 28 is a layer for protecting the periphery of the honeycomb filter 20 and may contain the inorganic particles, the inorganic fiber, and the binding material described above.

In the honeycomb filter 20, the thermal expansion coefficient of the cell 23 in the longitudinal direction at a temperature in the range of 40° C. to 800° C. is preferably $6.0 \times 10^{-6}/°$ C. or less, more preferably $1.0 \times 10^{-6}/°$ C. or less, still more preferably $0.8 \times 10^{-6}/°$ C. or less. At a thermal expansion coefficient of $6.0 \times 10^{-6}/°$ C. or less, thermal stress generated by exposure to a high-temperature exhaust gas can be within tolerance.

A method for manufacturing the honeycomb filter 20 will be described below. A method for manufacturing the honeycomb filter 20 may include a partition portion forming step of forming a plurality of porous partition portions 22 each forming a cell, the cell being open at one end and closed at the other end and serving as a flow path of the fluid, a trapping layer forming step of forming a trapping layer 24 for trapping and removing PM contained in an exhaust gas, an entire catalyst forming step of bringing the entire honeycomb structure into contact with a catalyst component to form a catalyst, the honeycomb structure including a plurality of porous partition portions, each of the partition portions forming a cell that is open at one end and closed at the other end and serves as a flow path of a fluid, and a partial catalyst forming step of bringing only an upstream region of the honeycomb structure into contact with a catalyst component to form a catalyst, the honeycomb structure including a plurality of porous partition portions, each of the partition portions forming a cell that is open at one end and closed at the other end and serves as a flow path of a fluid.

In the partition portion forming step of the method for manufacturing a honeycomb filter, the partition portions 22 are formed with a mixture of the raw materials for the partition portions 22 by a particular forming method. The partition portions 22 are formed simultaneously with the formation of a honeycomb formed product before the formation and baking of the trapping layers 24. The raw materials for the partition portions 22, for example, a base material, a pore-forming material, and a dispersion medium may be mixed to prepare a pug or slurry. The base material may be the inorganic material described above. For a SiC base material, a 80:20 mixture of a SiC powder and a metallic Si powder based on the mass ratio may be kneaded with a dispersion medium, such as water, a pore-forming material, and an organic binder to form a plastic pug. The SiC powder and metallic Si powder raw materials (molding raw materials) may be kneaded to prepare a pug by any method, for example, a method using a kneader or a vacuum pug mill. The pore-forming material is preferably burnt in a subsequent baking process and may be starch, coke, or foamable resin. If necessary, a binder or a dispersant may he added to the pug. The binder is preferably an organic binder, such as a cellulose binder. The dispersant may be a surfactant, such as ethylene glycol. The partition portions 22 may be formed as a honeycomb formed product in the shape described above by extrusion molding using a die with which an array of cells 23 can be formed. The sealing portions 26 are then formed in the honeycomb formed product. The sealing portions 26 are preferably formed such that the cells 23 each of which is open at one end and closed at the other end and the cells 23 each of which is closed at one end and open at the other end are alternately disposed. The raw materials for sealing may be the raw materials for forming the partition portions 22. The resulting honeycomb formed product is preferably dried, calcined, and baked. In calcination, the organic components in the honeycomb formed product are removed by combustion at a temperature lower than the baking temperature. The baking temperature may range from 1400° C. to 1450° C. for a cordierite raw material and may be 1450° C. for Si-bonded SiC. Through these processes, a honeycomb structure before the formation of the trapping layers 24 can be formed. The term "honeycomb structure", as used herein, refers to a honeycomb structure that constitutes each of the honeycomb segments 21 or a honeycomb structure that constitutes the honeycomb filter 20 in which a plurality of honeycomb segments 21 are joined together.

In the method for manufacturing a honeycomb filter, the trapping layer forming step may be performed in a wet or dry system. In the trapping layer forming step, the trapping layer 24 may be formed such that the thickness of the downstream trapping layer 24b is larger than the thickness of the upstream trapping layer 24a in the honeycomb filter 20. The trapping layer 24 preferably has an average thickness of 10 μm or more and 80 μm or less. At a trapping layer thickness of 10 μm or more, it is easy to trap PM. A trapping layer thickness of 80 μm or less results in a decrease in the permeation resistance of a partition and a decrease in pressure loss. The average thickness of the trapping layer is preferably 20 μm or more and 60 μm or less, more preferably 30 μm or more and 50 μm or less.

In a wet trapping layer forming step, a slurry containing the raw materials for the trapping layers 24 is supplied to the cells 23 to form the trapping layers 24. The slurry may be prepared by mixing an inorganic fiber, a binding material, a binder, and a dispersion medium as the raw materials for the trapping layers 24. The slurry may also be prepared by mixing inorganic particles, a binding material, a binder, and a dispersion medium as the raw materials for the trapping layers 24. The inorganic fiber may be that described above and preferably has an average diameter of 0.5 μm or more and 8 μm or less and an average length of 100 μm or more and 500 μm or less. The inorganic particles may be particles made of the inorganic material described above. For a SiC base material, SiC particles having an average size of 0.1 μm or more and 30 μm or less can be used. The binding material may be colloidal silica or clay. The binder is preferably an organic binder, such as a cellulose binder. The dispersant may be a surfactant, such as ethylene glycol. The average particle size is the median size (D50) measured with a laser diffraction/scattering particle size distribution analyzer using water as a dispersion medium.

In the trapping layer forming step, the solid components of the slurry may be applied to the partition portions 22 while the slurry is drawn by suction into the cells 23 from the inlet side, or the solid components of the slurry may be applied to the partition portions 22 while the slurry is forced into the cells 23 from the inlet side. The latter can form the trapping layer 24 having a more uniform thickness. After the raw materials are applied to the partition portions 22, the trapping layers 24 are preferably fixed by drying and heat treatment. The heat treatment temperature is preferably 200° C. or more and 900° C. or less, more preferably 650° C. or more and 750° C. or less. Heat treatment at a temperature of 200° C. or more can ensure sufficient removal of the organic substances contained in the slurry. Heat treatment at a temperature of 900° C. or less can prevent the reduction of pores.

A dry trapping layer forming step may involve supplying a gas containing the raw material for the trapping layer to an inlet cell using a gas (air) as a transport medium for the raw material for the trapping layer. This is preferred because the particle groups constituting the trapping layer become coarse and can form a trapping layer having a very high porosity. The raw material for the trapping layer may be inorganic fiber or inorganic particles. The inorganic fiber may be that described above and preferably has an average size of 0.5 μm or more and 8 μm or less and an average length of 100 μm or more and 500 μm or less. The inorganic particles may be particles made of the inorganic material described above. For example, SiC particles or cordierite particles having an average size of 0.5 μm or more and 15 μm or less can be used. The raw material for the trapping layer preferably has an average particle size smaller than the average pore size of the partition portion 22. In this case, the inorganic material of the partition portion 22 is preferably the same as the inorganic material of the trapping layer 24. A gas containing inorganic particles is preferably introduced by suction on the gas outlet side. In the formation of the trapping layer 24, in addition to inorganic fiber or inorganic particles, a binding material may be supplied. The binding material may be selected from sol materials and colloid materials and is preferably colloidal silica. Preferably, the inorganic particles are coated with silica, and the inorganic particles are bound to each other with silica, and the inorganic particles are bound to the material of the partition portion with silica. In the case of an oxide material, such as cordierite or aluminum titanate, the inorganic particles are preferably bound to each other by sintering, and the inorganic particles are preferably bound to the material of the partition portion by sintering. The trapping layer 24 is preferably bonded to the partition portion 22 by forming a layer of the raw material on the partition portion 22 and performing heat treatment. The heat treatment temperature is preferably 650° C. or more and 1350° C. or less. Heat treatment at a temperature of 650° C. or more can ensure a sufficient bonding strength. Heat treatment at a temperature of 1350° C. or less can prevent the blockage of pores caused by excessive oxidation of the particles.

A method for manufacturing the honeycomb filter 20 includes an entire catalyst forming step of bringing the entire honeycomb structure into contact with a catalyst component to form a catalyst and a partial catalyst forming step of bringing only an upstream region of the honeycomb structure into contact with a catalyst component to form a catalyst. The entire catalyst forming step and the partial catalyst forming step may be preceded by the partition portion forming step and followed by the trapping layer forming step or may be preceded by the trapping layer forming step. The entire catalyst forming step may be preceded or followed by the partial catalyst forming step. In the case that the entire catalyst forming step is followed by the partial catalyst forming step, an entire catalyst drying step of drying the catalyst may be performed after the entire catalyst forming step, subsequently a partial catalyst drying step of drying the catalyst may be performed after the partial catalyst forming step, and finally a baking step (heat-treatment step) of loading the catalyst by baking or high-temperature heat treatment may be performed. Alternatively, the baking step (heat-treatment step) of loading the catalyst by baking or high-temperature heat treatment may be performed after the entire catalyst forming step, subsequently the partial catalyst forming step may be performed, and finally the baking step (heat-treatment step) may be performed. The same can be applied to the case that the partial catalyst forming step is followed by the entire catalyst forming step. The catalyst to be formed in the trapping layer 24 may be appropriately selected from the catalysts for oxidizing unburned gases and the catalysts for decomposing NOx described above. The catalyst may be formed by any method. For example, a catalyst liquid containing the catalyst components may be applied as a wash coat to the trapping layers 24 of the honeycomb structure. A conventionally known ceramic film forming method, such as dipping, may be used. The amount of catalyst can be adjusted to a desired value by controlling the concentration of a catalyst liquid containing the catalyst and the catalyst loading time. In order to achieve high dispersion loading, the catalyst component of a catalyst for oxidizing unburned gases or a catalyst for decomposing NOx may be loaded on a heat resistant inorganic oxide having a large specific surface area, such as alumina, which is then loaded on the partition or the like of the honeycomb structure. The catalyst may be formed by applying a catalyst slurry to the pores of the partition and/or the PM trapping layer by a conventionally known catalyst loading method, such as a suctioning technique, and drying and baking the catalyst slurry.

A method for forming a catalyst by dipping will be described below with reference to FIGS. 8 and 9. First, a honeycomb structure is entirely immersed in a container filled with a catalyst liquid (see FIG. 8(*a*)). After a predetermined time, the honeycomb structure is pulled up from the container, and the catalyst component is fully dried (see FIG. 8(*b*)). Thus, the catalyst is uniformly formed in the upstream region and the downstream region of the honeycomb structure. In the partial catalyst forming step, drying the catalyst can reduce the elution of the catalyst component formed in the entire catalyst forming step. An upstream region of the honeycomb structure is then immersed in a container filled with the catalyst liquid (see FIG. 8(c)). After a predetermined time, the honeycomb structure is pulled up from the container, and the catalyst component is fully dried (see FIG. 8(d)). Thus, the catalyst is further formed in the upstream region of the honeycomb structure, thus increasing the amount of catalyst in the upstream region. A higher catalyst concentration of the catalyst liquid in which the upstream region is immersed can more easily increase the catalyst concentration in the upstream region relative to the catalyst concentration in the downstream region. When the upstream region of the honeycomb structure is immersed in the catalyst liquid as illustrated in FIG. 8(c), the catalyst liquid enters not only the cells having an opening in contact with the catalyst liquid but also the cells having the sealing portion 26 in contact with the catalyst liquid (see FIG. 9). Thus, the catalyst component can be uniformly applied to the entire upstream region. Preferably, the catalyst particles are smaller than the pores of the partition portion and can pass through the partition.

A method for manufacturing the honeycomb filter 20 may include a partition portion forming step of forming a plurality of porous partition portions 22 each forming a cell, the cell being open at one end and closed at the other end and serving as a flow path of the fluid, a trapping layer forming step of forming a trapping layer 24 for trapping and removing PM contained in an exhaust gas, an upstream catalyst forming step of bringing only an upstream region of the honeycomb structure into contact with a catalyst component to form a catalyst, the honeycomb structure including a plurality of porous partition portions, each of the partition portions forming a cell that is open at one end and closed at the other end and serves as a flow path of a fluid, and a downstream catalyst forming step of bringing only a downstream region of the honeycomb structure into contact with a catalyst component to form a catalyst, the honeycomb structure including a plurality of porous partition portions, each of the partition portions forming a cell that is open at one end and closed at the other end and serves as a flow path of a fluid, the catalyst component having a lower concentration than the catalyst component for the upstream region.

The partition portion forming step and the trapping layer forming step are performed in the manner described above. A method for manufacturing the honeycomb filter 20 includes an upstream catalyst forming step of bringing only the upstream region of the honeycomb structure into contact with a catalyst component to form a catalyst and a downstream catalyst forming step of bringing only a downstream region of the honeycomb structure into contact with a catalyst component to form a catalyst, the catalyst component having a lower concentration than the catalyst component for the upstream region. The upstream catalyst forming step and the downstream catalyst forming step may be preceded by the partition portion forming step and followed by the trapping layer forming step or may be preceded by the trapping layer forming step. The upstream catalyst forming step may be preceded or followed by the downstream catalyst forming step. In the case that the upstream catalyst forming step is followed by the downstream catalyst forming step, an upstream catalyst drying step of drying the catalyst may be performed after the upstream catalyst forming step, subsequently a downstream catalyst drying step of drying the catalyst may be performed after the downstream catalyst forming step, and finally a baking step (heat-treatment step) of loading the catalyst by baking or high-temperature heat treatment may be performed. Alternatively, the baking step (heat-treatment step) of loading the catalyst by baking or high-temperature heat treatment may be performed after the upstream catalyst forming step, subsequently the downstream catalyst forming step may be performed, and finally the baking step (heat-treatment step) may be performed. The same can be applied to the case that the downstream catalyst forming step is followed by the upstream catalyst forming step. The catalyst to be formed in the trapping layer 24 may be appropriately selected from the catalysts for oxidizing unburned gases and the catalysts for decomposing NOx described above. The catalyst may be formed by the same method as in the entire catalyst forming step or the partial catalyst forming step.

A honeycomb filter according to the present embodiment and a honeycomb filter manufactured by the method described above have an appropriate ratio of the amount of catalyst a in the upstream partition portion 22a to the amount of catalyst b in the downstream partition portion 22b and includes a trapping layer for trapping and removing solid components. Thus, these honeycomb filters can have high purification efficiency and temperature rise performance without an increase in pressure loss.

The present invention is not limited to the above-mentioned embodiments and can be implemented as various embodiments within the scope of the present invention.

Figure 10:
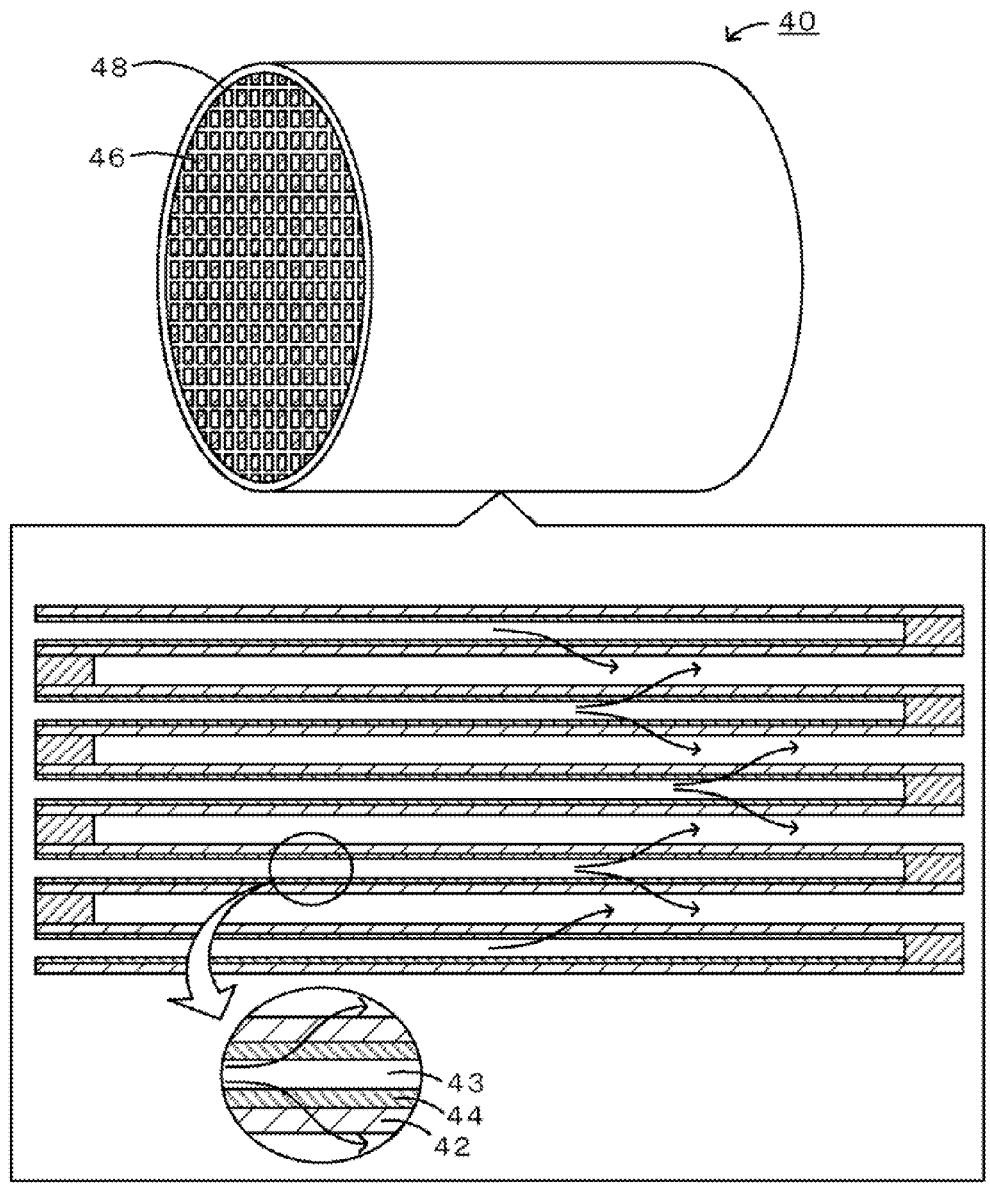
FIG. 10 is an explanatory view of a honeycomb filter 40.

Although the honeycomb segments 21 are joined together with the bonding layer 27 in the honeycomb filter 20 according to the present embodiment, an integrally molded honeycomb filter 40 as illustrated in FIG. 10 is also suitable. In the honeycomb filter 40, partition portions 42, cells 43, trapping layers 44, sealing portions 46, and an outer protective portion 48 may have the same structure as the partition portions 22, the cells 23, the trapping layers 24, the sealing portions 26, and the outer protective portion 28 of the honeycomb filter 20, respectively. The honeycomb filter 40 can also have high purification efficiency and temperature rise performance without an increase in pressure loss.

Although the honeycomb filter 20 contains a catalyst in the present embodiment, any honeycomb filter that can filter out substances to be removed in a fluid is suitable. Although the present embodiment has described the honeycomb filter 20 for use in automobiles, any honeycomb filter for trapping and removing solid components contained in a fluid, such as honeycomb filters for electricity-generating engines and honeycomb filters for construction equipment, may be suitable.

EXAMPLES

Specific examples of the manufacture of a honeycomb filter will be described below.

Manufacture of Honeycomb Filter

A honeycomb segment was manufactured as described below. A SiC powder and a metallic Si powder were mixed at a mass ratio of 80:20. The mixture was kneaded with methylcellulose, hydroxypropoxylmethylcellulose, a surfactant, and water to prepare a plastic pug. The pug was extruded through a die to form a honeycomb segment formed product having a desired shape. The thickness of the partition portion was 305 μm, the cross section was 35 mm×35 mm, and the length was 152.4 mm. The honeycomb segment formed product was dried using a microwave and then with hot air, was sealed, was calcined in an oxidizing atmosphere at 550° C. for three hours, and was baked in an inert atmosphere at 1400° C. for two hours. The sealing portions were formed by masking alternate cell openings of the segment formed product at one end face and immersing the masked end face in a sealing slurry containing a SiC raw material, thereby alternately forming openings and sealing portions. The other end face was then masked in the same manner. The sealing portions were formed such that a cell that is open at one end and closed at the other end and a cell that is closed at one end and open at the other end are alternately disposed. In this manner, a honeycomb segment was manufactured. The porosity of the partition portion was 42%.

Figure 11:
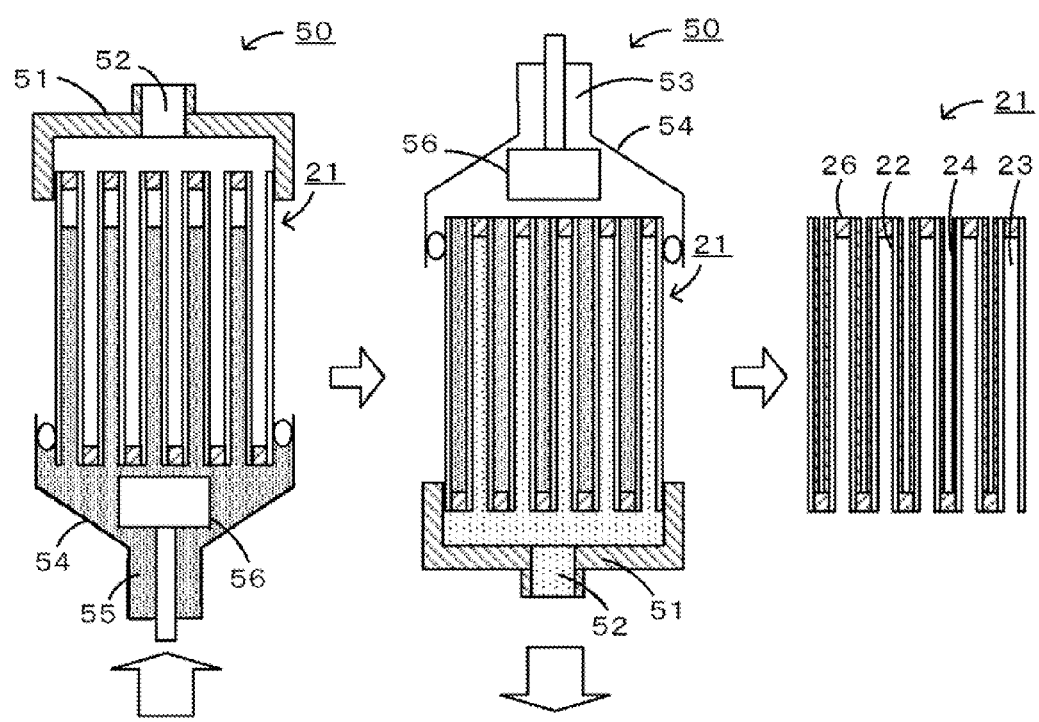
FIG. 11 is an explanatory view of the structure of a trapping layer forming apparatus 50.

The trapping layers were then formed in a wet system. First, for the honeycomb segment described above, 2.5% by weight SiC (having an average particle size of 15 μm) as inorganic particles, 0.5% by weight carboxymethylcellulose as an organic binder, 2% by weight colloidal silica as a binding material, and 95% by weight of water as a dispersion medium were mixed to prepare a slurry for the trapping layers. The trapping layers were then formed with a trapping layer forming apparatus 50 illustrated in FIG. 10. One end of the honeycomb segment was fixed to a jig 51, and the other end of the honeycomb segment was fixed to a feeding and fixing barrel 54. The jig 51 had a center through-hole 52. The feeding and fixing barrel 54 had a supply port 53 for slurry at the top. A supply control plate 56 for controlling the amount of slurry supplied was disposed between the feeding and fixing barrel 54 and the honeycomb segment 21. The supply control plate 56 can control the slurry flow rate. The supply control plate 56 was fixed at an empirically determined position so as to achieve a predetermined film thickness. The slurry was supplied to the cells of the honeycomb segment having no sealing portion 26 facing the supply port 53 (see the left in FIG. 11). The solvent of slurry, water, was discharged through the partition portions 22 by suction through the through-hole 52 of the jig 51 (see the middle of FIG. 11). The solids of the slurry remaining in the cells 23 having an opening facing the feeding and fixing barrel 54 formed the trapping layers on the partition portions. The resulting honeycomb structure was dried in a hot-air dryer and was heat-treated at 700° C. for one hour to form a honeycomb segment having the trapping layers (see the right in FIG. 11).

A binder slurry prepared by kneading alumina silicate fiber, colloidal silica, poly(vinyl alcohol), silicon carbide, and water was applied to a side surface of each of the honeycomb segments having the trapping layers thus formed. The honeycomb segments were assembled and pressed against each other and were heat-dried to form a tetragonal honeycomb segment assembly. The honeycomb segment assembly was cylindrically ground. A coating slurry composed of the same materials as the binder slurry was then applied to the honeycomb segment assembly and was hardened by drying to manufacture a cylindrical honeycomb filter having a desired shape, segment shape, and cell structure. The honeycomb filter had a cross section diameter of 143.8 mm and a length of 152.4 mm.

Comparative Example 1

A catalyst was loaded as described below. Raw materials of alumina:platinum:ceria-based material=7:0.5:2.5 based on the weight ratio in which the ceria-based material was Ce:Zr:Pr:Y:Mn=60:20:10:5:5 based on the weight ratio were mixed to prepare an aqueous catalyst slurry. The catalyst slurries described below had this composition and had different particle sizes and concentrations for each purpose. The particle size of a catalyst smaller than the pore size of a trapping layer such that the catalyst can pass through the trapping layer is hereinafter referred to as a small particle size. The particle size of a catalyst larger than the pore size of a trapping layer such that the catalyst can be trapped on the surface of the trapping layer is hereinafter referred to as a large particle size. A predetermined length of a downstream region of a honeycomb filter was immersed in a predetermined concentration of the catalyst slurry having a small particle size. The catalyst slurry was drawn in by suction at a predetermined suction pressure and suction flow rate for a predetermined time to form a catalyst from the upstream side, was dried at 120° C. for two hours, and was baked at 550° C. for one hour. The amount of catalyst per unit volume of the entire honeycomb filter was 20 g/L (the same applies hereinafter). In this manner, a honeycomb filter according to Comparative Example 1 was manufactured in which the ratio a/b of the amount of catalyst a in the upstream partition portion to the amount of catalyst b in the downstream partition portion was 1, the ratio A/B of the amount of catalyst A in the upstream trapping layer to the amount of catalyst B in the downstream trapping layer was 1, and the ratio $A_s/B_s$ of the amount of catalyst $A_s$ on the upstream trapping layer surface to the amount of catalyst $B_s$ on the downstream trapping layer surface was 1.

Comparative Example 2

A predetermined length of a downstream region of a honeycomb filter was immersed in a predetermined concentration of the catalyst slurry having a small particle size. The catalyst slurry was drawn in by suction at a predetermined suction pressure and suction flow rate for a predetermined time to form a catalyst from the upstream side and was dried at 120° C. for two hours. The catalyst having a uniform concentration in the upstream and downstream regions was fixed to the partition portion, the trapping layer, and the trapping layer surface. A predetermined length of an upstream region of the honeycomb filter was immersed in a predetermined concentration of the catalyst slurry having a small particle size for a predetermined time to form a catalyst. Air was blown against the trapping layer surface at a pressure of 0.3 MPa to force the catalyst formed on the trapping layer and the trapping layer surface to the partition portion. The catalyst was dried at 120° C. for two hours and was baked at 550° C. for one hour. In this manner, a honeycomb filter according to Comparative Example 2 was manufactured in which a/b=1.03, A/B=1, and $A_s/B_s$=1.

Examples 1 to 6

A honeycomb filter according to Example 1 was manufactured in the same manner as in Comparative Example 2 except that a/b=1.05. A honeycomb filter according to Example 2 was manufactured in the same manner as in Comparative Example 2 except that a/b=1.08. A honeycomb filter according to Example 3 was manufactured in the same manner as in Comparative Example 2 except that a/b=1.1. A honeycomb filter according to Example 4 was manufactured in the same manner as in Comparative Example 2 except that a/b=1.5. A honeycomb filter according to Example 5 was manufactured in the same manner as in Comparative Example 2 except that a/b=2. A honeycomb filter according to Example 6 was manufactured in the same manner as in Comparative Example 2 except that a/b=3.

Comparative Example 3

A honeycomb filter according to Comparative Example 3 was manufactured in the same manner as in Comparative Example 2 except that a/b=5.

Comparative Example 4 to 6

A honeycomb filter according to Comparative Example 4 was manufactured in the same manner as in Comparative Example 2 except that the trapping layer forming step was omitted and a/b=1.05. A honeycomb filter according to Comparative Example 5 was manufactured in the same manner as in Comparative Example 4 except that a/b=1.5. A honeycomb filter according to Comparative Example 6 was manufactured in the same manner as in Comparative Example 4 except that a/b=3.0.

Examples 7 to 15

A predetermined length of a downstream region of a honeycomb filter was immersed in a predetermined concentration of the catalyst slurry having a small particle size. The catalyst slurry was drawn in by suction at a predetermined suction pressure and suction flow rate for a predetermined time to form a catalyst from the upstream side and was dried at 120° C. for two hours. A predetermined length of an upstream region of the honeycomb filter was immersed in a predetermined concentration of the catalyst slurry having a small particle size for a predetermined time to form a catalyst. Air was blown against the trapping layer surface to force the catalyst formed on the trapping layer and the trapping layer surface to the partition portion, and the catalyst was dried at 120° C. for two hours. Thus, the catalyst was fixed to the upstream region of the partition portion at a high concentration and to the upstream and downstream regions of the trapping layer and the trapping layer surface at a uniform concentration. A predetermined length of the upstream region of the honeycomb filter was immersed in a predetermined concentration of the catalyst slurry having a small particle size for a predetermined time to form a catalyst. Air was blown against the trapping layer surface to force the catalyst formed on the trapping layer surface into the trapping layer. The catalyst was dried at 120° C. for two hours and was baked at 550° C. for one hour. In this manner, a honeycomb filter according to Example 7 was manufactured in which a/b=1.5, A/B=1.03, and $A_s/B_s$=1. A honeycomb filter according to Example 8 was manufactured in the same manner as in Example 7 except that A/B=1.05. A honeycomb filter according to Example 9 was manufactured in the same manner as in Example 7 except that A/B=1.08. A honeycomb filter according to Example 10 was manufactured in the same manner as in Example 7 except that A/B=1.1. A honeycomb filter according to Example 11 was manufactured in the same manner as in Example 7 except that A/B=1.5. A honeycomb filter according to Example 12 was manufactured in the same manner as in Example 7 except that A/B=2. A honeycomb filter according to Example 13 was manufactured in the same manner as in Example 7 except that A/B=3. A honeycomb filter according to Example 14 was manufactured in the same manner as in Example 7 except that A/B=5. A honeycomb filter according to Example 15 was manufactured in the same manner as in Example 7 except that A/B=8.

Examples 16 to 25

A predetermined length of a downstream region of a honeycomb filter was immersed in a predetermined concentration of the catalyst slurry having a small particle size. The catalyst slurry was drawn in by suction at a predetermined suction pressure and suction flow rate for a predetermined time to form a catalyst from the upstream side and was dried at 120° C. for two hours. A predetermined length of an upstream region of the honeycomb filter was immersed in a predetermined concentration of the catalyst slurry having a small particle size for a predetermined time to form a catalyst, and the catalyst was dried at 120° C. for two hours. Thus, the catalyst was fixed to the partition portion, the trapping layer, and the trapping layer surface such that the upstream region had a high concentration of the catalyst. A predetermined length of the upstream region of the honeycomb filter was immersed in a predetermined concentration of the catalyst slurry having a large particle size for a predetermined time to form a catalyst. The catalyst was dried at 120° C. for two hours and was baked at 550° C. for one hour. In this manner, a honeycomb filter according to Example 16 was manufactured in which a/b=1.5, A/B=1.5, and $A_s/B_s$=1.03. A honeycomb filter according to Example 17 was manufactured in the same manner as in Example 16 except that $A_s/B_s$=1.05. A honeycomb filter according to Example 18 was manufactured in the same manner as in Example 16 except that $A_s/B_s$=1.08. A honeycomb filter according to Example 19 was manufactured in the same manner as in Example 16 except that $A_s/B_s$=1.1. A honeycomb filter according to Example 20 was manufactured in the same manner as in Example 16 except that $A_s/B_s$=1.5. A honeycomb filter according to Example 21 was manufactured in the same manner as in Example 16 except that $A_s/B_s$=2. A honeycomb filter according to Example 22 was manufactured in the same manner as in Example 16 except that $A_s/B_s$=3. A honeycomb filter according to Example 23 was manufactured in the same manner as in Example 16 except that $A_s/B_s$=5. A honeycomb filter according to Example 24 was manufactured in the same manner as in Example 16 except that $A_s/B_s$=8. A honeycomb filter according to Example 25 was manufactured in the same manner as in Example 16 except that $A_s/B_s$=10.

Example 26

A honeycomb filter according to Example 26 was manufactured in the same manner as in Example 22 except that the trapping layer was formed in a dry system. The trapping layer was formed in a dry system as described below. Air containing SiC particles having an average size smaller than the average pore size of the partition was introduced from open ends on the exhaust gas inlet side of the honeycomb segment manufactured as described above while drawn in by suction from the outlet side of the honeycomb segments. The SiC particles were deposited on the surface layer of the partition on the exhaust gas inlet side. Heat treatment in the atmosphere at 1300° C. for two hours was performed to join the SiC particles deposited on the surface layer of the partition together and the deposited SiC particles and SiC and Si particles constituting the partition together. Thus, a honeycomb segment having the trapping layer was manufactured.

Example 27

A honeycomb segment having no trapping layer as described in Comparative Example 6 was coated with a catalyst at a/b=3. A trapping layer was formed in a wet system in the same manner as in Example 1. The resulting honeycomb filter was referred to as Example 27. In Example 27, the catalyst was formed on the partition portion but was not formed on the trapping layer and a/b=3, A/B=not available, and $A_s/B_s$=not available. The measurements for Example 27 together with Examples described above were shown in Table 1.

Measurement of Amount of Catalyst

For the manufactured honeycomb filters, the amount of catalyst was measured in the following manner. A test sample for measuring the amounts of catalyst a and b in the partition portion 22 and the amounts of catalyst A and B in the trapping layer 24 was prepared by cutting a partition substrate from the honeycomb filter 20 such that a measuring cross section (X-Y plane) served as a surface to be measured, embedding the partition substrate in a resin, and polishing the resin. The resin embedding employed a two-part resin composed of a Speci-Fix epoxy resin (manufactured by Struers A/S.) and a Speci-Fiz-20 curing agent (manufactured by Struers A/S.). A test sample for the amounts of catalyst $A_s$ and $B_s$ in the trapping layer surface 25 was prepared by cutting a partition substrate from the honeycomb filter 20 such that the surface (film surface) of the trapping layer 24 served as a surface to be measured. SEM observation was then performed with a scanning electron microscope (S-3200N, manufactured by Hitachi High-Technologies Corp.) at a magnification of 500. Elementary analysis was then performed for the observed region with an energy dispersive X-ray analyzer (EMAX-5770W, manufactured by Horiba, Ltd.). The amount of aluminum measured in the elementary analysis was considered to be the amount of catalyst. The partition portion and the trapping layer were uniformly loaded with a catalyst in the thickness direction.

HC Purification Test after Durability Test

A temperature cycling of incoming exhaust gas in the range of 200° C. to 650° C. for 270 s was repeated 200 times as a durability test. A honeycomb filter after the durability test was installed in an exhaust gas downstream part in a 2.0-L diesel engine, which was driven in a steady state at an engine speed of 2000 rpm and a torque of 60 Nm. When the gas temperature in the upstream region of the honeycomb filter became stable, the ratio of the amount of outflowing HC to the amount of incoming HC was calculated as the purification efficiency (%) after the durability test.

Pressure Loss Test

An exhaust gas containing PM at 200° C. was flown at a flow rate of 2.27 Nm³/min to gradually deposit the PM within a honeycomb filter. When the PM volume amount to the external shape volume of the honeycomb filter reached 6 g/L, the inlet and outlet pressures of the honeycomb filter were measured. A difference between the inlet pressure and the outlet pressure was calculated as a pressure loss (kPa).

PM Regeneration Test

A honeycomb filter on which PM was deposited was prepared in the same manner as in the pressure loss test. The honeycomb filter was installed in an exhaust gas downstream part in a 2.0-L diesel engine, which was driven in a steady state at an engine speed of 2000 rpm and a torque of 60 Nm. When the gas temperature in the upstream region of the honeycomb filter became stable, a combustion gas at 650° C. was introduced by post-injection to regenerate the honeycomb filter for 10 minutes. The weights of the honeycomb filter before and after regeneration after PM deposition were measured to calculate PM regeneration efficiency (%)= (weight before regeneration−weight after regeneration)/initial PM weight.

Experimental Results

Table 1 shows the experimental results for Examples 1 to 6 and Comparative Examples 1 to 6. In Comparative Example 1, the upstream and downstream regions of each of the partition portion, the trapping layer, and the trapping layer surface were uniformly loaded with a catalyst. In Examples 1 to 6 and Comparative Examples 2 and 3, only the upstream region of the partition portion was loaded with a large amount of catalyst, and the upstream and downstream regions of each of the trapping layer and the trapping layer surface were uniformly loaded with a catalyst. Comparative Examples 4 to 6 had no trapping layer. The results show that a large a/b results in high purification efficiency after the durability test (HC removal efficiency). Comparative Examples 4 to 6 having no trapping layer had lower purification efficiency (%) after the durability test than the example having a/b=1. Thus, the formation of the trapping layer and a/b within the predetermined range synergistically increased the purification efficiency after the durability test. In particular, $1.05 \leq a/b \leq 3.00$ results in reduction of an increase in pressure loss and reduction in purification efficiency after the durability test. In particular, $1.5 \leq a/b \leq 3.0$ results in higher purification efficiency after the durability test. The possible reason for these effects is that frequent contact between an exhaust gas and the catalyst in the upstream region results in the rapid propagation of heat of oxidation of HC components to the entire honeycomb filter with a minimum of waste, thus improving temperature rise performance, increasing the catalyst activity to improve purification efficiency, or increasing the amount of PM combustion per regeneration treatment. Furthermore, the presence of the trapping layer on the partition surface can prevent the catalyst within the partition from being directly contacted with PM and thereby prevent catalyst poisoning caused by sulfur in the PM, thus improving HC purification efficiency even after the durability test. In Example 27, which had no catalyst in the trapping layer, the purification efficiency after the durability test was 68.8% with a change rate of 43%, the pressure loss was 7 kPa with a change rate of 0%, and the PM regeneration efficiency was 69.6% with a change rate of 4%. These results show that even in the absence of a catalyst in the trapping layer, different amounts of catalyst in the upstream region and the downstream region can achieve excellent performance.

TABLE 1

| | TRAPPING LAYER FORMING SYSTEM | a/b | A/B | $A_s/B_s$ | PURIFICATION EFFICIENCY AFTER DURABILITY TEST % | CHANGE RATE % | PRESSURE LOSS kPa | CHANGE RATE % | PM REGENERATION EFFICIENCY % | CHANGE RATE % |
|---|---|---|---|---|---|---|---|---|---|---|
| COMPARATIVE EXAMPLE 1 | WET | 1 | 1 | 1 | 48.0 | — | 7.0 | — | 67.0 | — |
| COMPARATIVE EXAMPLE 2 | WET | 1.03 | 1 | 1 | 48.1 | 0 | 7.0 | 0 | 67.2 | 0 |
| EXAMPLE 1 | WET | 1.05 | 1 | 1 | 50.6 | 5 | 7.0 | 0 | 67.1 | 0 |
| EXAMPLE 2 | WET | 1.08 | 1 | 1 | 52.2 | 9 | 7.0 | 0 | 67.1 | 0 |
| EXAMPLE 3 | WET | 1.1 | 1 | 1 | 53.2 | 11 | 7.0 | 0 | 67.3 | 0 |
| EXAMPLE 4 | WET | 1.5 | 1 | 1 | 58.4 | 22 | 7.0 | 0 | 68.0 | 1 |
| EXAMPLE 5 | WET | 2 | 1 | 1 | 63.6 | 33 | 6.9 | −1 | 68.7 | 2 |
| EXAMPLE 6 | WET | 3 | 1 | 1 | 68.8 | 43 | 7.0 | 0 | 69.6 | 4 |

TABLE 1-continued

| | TRAPPING LAYER FORMING SYSTEM | a/b | A/B | $A_s/B_s$ | PURIFICATION EFFICIENCY AFTER DURABILITY TEST | | PRESSURE LOSS | | PM REGENERATION EFFICIENCY | |
|---|---|---|---|---|---|---|---|---|---|---|
| | | | | | % | CHANGE RATE % | kPa | CHANGE RATE % | % | CHANGE RATE % |
| EXAMPLE 26 | WET | 3 | — | — | 68.8 | 43 | 7.0 | 0 | 69.6 | 4 |
| COMPARATIVE EXAMPLE 3 | WET | 5 | 1 | 1 | 74.0 | 54 | 9.1 | 30 | 73.6 | 10 |
| COMPARATIVE EXAMPLE 4 | NO | 1.05 | — | — | 35.8 | −25 | 8.4 | 20 | 69.1 | 3 |
| COMPARATIVE EXAMPLE 5 | NO | 1.5 | — | — | 37.6 | −22 | 8.4 | 19 | 69.0 | 3 |
| COMPARATIVE EXAMPLE 6 | NO | 3 | — | — | 40.7 | −15 | 8.4 | 20 | 71.2 | 6 | a: CATALYST AMOUNT NI UPSTREAM PARTITION PORTION (g/L)/b: CATALYST AMOUNT IN DOWN STREAM PARTITION PORTION (g/L)
A: CATALYST AMOUNT IN UPSTREAM TRAPPING LAYER (g/L)/B: CATALYST AMOUNT IN DOWNSTREAM TRAPPING LAYER (g/L)
$A_s$: CATALYST AMOUNT IN UPSTREAM TRAPPING LAYER SURFACE (g/L)/$B_s$: CATALYST AMOUNT IN DOWNSTREAM TRAPPING LAYER SURFACE (g/L)
※ CHANGE RATE IS RATIO TO COMPARATIVE EXAMPLE 1

Table 2 shows the experimental results for Example 4 and Examples 7 to 15. In Example 4 and Examples 7 to 15, the catalyst in the partition portion had a/b=1.5, the catalyst on the trapping layer surface had $A_s/B_s$=1, and A/B ranged from 1 to 8. The results show that a large A/B results in high purification efficiency after the durability test (HC removal efficiency). It was also shown that 1.08≦A/B≦5.00 results in reduction of an increase in pressure loss and high purification efficiency after the durability test. In particular, 1.50≦A/B≦5.00 results in higher purification efficiency, and 2.00≦A/B≦5.00 results in still higher purification efficiency.

TABLE 2

| | TRAPPING LAYER FORMING SYSTEM | a/b | A/B | $A_s/B_s$ | PURIFICATION EFFICIENCY AFTER DURABILITY TEST | | PRESSURE LOSS | | PM REGENERATION EFFICIENCY | |
|---|---|---|---|---|---|---|---|---|---|---|
| | | | | | % | CHANGE RATE % | kPa | CHANGE RATE % | % | CHANGE RATE % |
| EXAMPLE 4 | WET | 1.5 | 1 | 1 | 58.4 | — | 7.0 | — | 68.0 | — |
| EXAMPLE 7 | WET | 1.5 | 1.03 | 1 | 58.4 | 0 | 7.0 | 0 | 68.0 | 0 |
| EXAMPLE 8 | WET | 1.5 | 1.05 | 1 | 66.7 | 14 | 7.0 | 0 | 68.0 | 0 |
| EXAMPLE 9 | WET | 1.5 | 1.08 | 1 | 83.4 | 43 | 7.0 | 0 | 68.0 | 0 |
| EXAMPLE 10 | WET | 1.5 | 1.1 | 1 | 87.5 | 50 | 7.0 | 0 | 68.1 | 0 |
| EXAMPLE 11 | WET | 1.5 | 1.5 | 1 | 90.8 | 56 | 6.9 | −1 | 68.1 | 0 |
| EXAMPLE 12 | WET | 1.5 | 2 | 1 | 93.8 | 61 | 6.9 | −1 | 68.1 | 0 |
| EXAMPLE 13 | WET | 1.5 | 3 | 1 | 95.8 | 64 | 6.9 | −1 | 68.2 | 0 |
| EXAMPLE 14 | WET | 1.5 | 5 | 1 | 97.1 | 66 | 7.0 | 0 | 68.0 | 0 |
| EXAMPLE 15 | WET | 1.5 | 8 | 1 | 98.3 | 68 | 8.7 | 25 | 68.1 | 0 | a: CATALYST AMOUNT NI UPSTREAM PARTITION PORTION (g/L)/b: CATALYST AMOUNT IN DOWN STREAM PARTITION PORTION (g/L)
A: CATALYST AMOUNT IN UPSTREAM TRAPPING LAYER (g/L)/B: CATALYST AMOUNT IN DOWNSTREAM TRAPPING LAYER (g/L)
$A_s$: CATALYST AMOUNT IN UPSTREAM TRAPPING LAYER SURFACE (g/L)/$B_s$: CATALYST AMOUNT IN DOWNSTREAM TRAPPING LAYER SURFACE (g/L)
※ CHANGE RATE IS RATIO TO EXAMPLE 4

Table 3 shows the experimental results for Example 11 and Examples 16 to 26. In Example 11 and Examples 16 to 25, the catalyst in the partition portion had a/b=1.5, the catalyst in the trapping layer had A/B=1.5, and $A_s/B_s$ ranged from 1 to 10. The results show that a large $A_s/B_s$ results in high purification efficiency after the durability test (HC removal efficiency) and improved PM regeneration efficiency. In particular, 1.10≦$A_s/B_s$≦8.00 results in further reduction of an increase in pressure loss and further improved PM regeneration efficiency. In particular, 1.50≦$A_s/B_s$≦8.00 results in still further improved PM regeneration efficiency, and 3.00≦$A_s/B_s$≦8.00 results in still further improved PM regeneration efficiency. Example 26, in which the trapping layer was formed in a dry system, had substantially the same results as Example 22, which was manufactured in the same manner as in Example 26 except that the trapping layer was formed by a different method. This suggests that the method for forming the trapping layer is insignificant.

TABLE 3

| | TRAPPING LAYER FORMING SYSTEM | a/b | A/B | $A_s/B_s$ | PURIFICATION EFFICIENCY AFTER DURABILITY TEST % | CHANGE RATE % | PRESSURE LOSS kPa | CHANGE RATE % | PM REGENERATION EFFICIENCY % | CHANGE RATE % |
|---|---|---|---|---|---|---|---|---|---|---|
| EXAMPLE 11 | WET | 1.5 | 1.5 | 1 | 90.8 | — | 6.9 | — | 68.1 | — |
| EXAMPLE 16 | WET | 1.5 | 1.5 | 1.03 | 90.9 | 0 | 6.9 | 0 | 68.1 | 0 |
| EXAMPLE 17 | WET | 1.5 | 1.5 | 1.05 | 90.9 | 0 | 6.9 | 0 | 68.1 | 0 |
| EXAMPLE 18 | WET | 1.5 | 1.5 | 1.08 | 91.3 | 1 | 6.9 | 0 | 68.2 | 0 |
| EXAMPLE 19 | WET | 1.5 | 1.5 | 1.1 | 91.8 | 1 | 6.9 | 0 | 77.6 | 14 |
| EXAMPLE 20 | WET | 1.5 | 1.5 | 1.5 | 92.7 | 2 | 6.9 | 0 | 84.0 | 23 |
| EXAMPLE 21 | WET | 1.5 | 1.5 | 2 | 93.6 | 3 | 6.8 | −1 | 87.2 | 28 |
| EXAMPLE 22 | WET | 1.5 | 1.5 | 3 | 94.1 | 4 | 6.8 | −1 | 90.4 | 33 |
| EXAMPLE 23 | WET | 1.5 | 1.5 | 5 | 94.5 | 4 | 6.9 | 0 | 93.6 | 38 |
| EXAMPLE 24 | WET | 1.5 | 1.5 | 8 | 94.8 | 4 | 6.9 | 0 | 95.2 | 40 |
| EXAMPLE 25 | WET | 1.5 | 1.5 | 10 | 95.0 | 5 | 8.3 | 20 | 96.8 | 42 |
| EXAMPLE 26 | DRY | 1.5 | 1.5 | 3 | 92.3 | 2 | 6.5 | −8 | 90.2 | 35 | a: CATALYST AMOUNT NI UPSTREAM PARTITION PORTION (g/L)/b: CATALYST AMOUNT IN DOWN STREAM PARTITION PORTION (g/L)
A: CATALYST AMOUNT IN UPSTREAM TRAPPING LAYER (g/L)/B: CATALYST AMOUNT IN DOWNSTREAM TRAPPING LAYER (g/L)
$A_s$: CATALYST AMOUNT IN UPSTREAM TRAPPING LAYER SURFACE (g/L)/$B_s$: CATALYST AMOUNT IN DOWNSTREAM TRAPPING LAYER SURFACE (g/L)
※ CHANGE RATE IS RATIO TO EXAMPLE 11

The present application is based on the priority of Japanese Patent Application No. 2010-81903 filed on Mar. 31, 2010, the entire contents of which are incorporated herein by reference.

Industrial Applicability

The present invention can suitably be applied to filters for purifying exhaust gases emitted from automobile engines, stationary engines for construction equipment, industrial stationary engines, and combustion equipment.

The invention claimed is:

1. A honeycomb filter, comprising:
a plurality of porous partition portions each forming a cell that is open at one end and closed at the other end and serves as a flow path of a fluid, at least part of each of the partition portions being loaded with a catalyst; and
a trapping layer for trapping and removing solid components contained in the fluid, the trapping layer being disposed on each of the partition portions,
wherein the amount of catalyst a within cells and on a surface of an upstream partition portion, which is formed of part of each of the partition portions on the upstream side of the cell, and the amount of catalyst b within cells and on a surface of a downstream partition portion, which is formed of part of each of the partition portions on the downstream side of the cell, satisfy $1.05 \leq a/b \leq 3.00$, and
wherein at least part of the trapping layer is loaded with a catalyst, and the amount of catalyst A in an upstream trapping layer, which is formed of part of the trapping layer in the upstream partition portion, and the amount of catalyst B in a downstream trapping layer, which is formed of part of the trapping layer in the downstream partition portion, satisfy $1.08 \leq A/B \leq 5.00$.

2. The honeycomb filter according to claim 1, wherein at least a surface of the trapping layer on a flow path side is loaded with a catalyst, and the amount of catalyst $A_s$ on an upstream trapping layer surface, which is a cell surface of an upstream trapping layer formed of part of the trapping layer in the upstream partition portion, and the amount of catalyst $B_s$) on a downstream trapping layer surface, which is a cell surface of a downstream trapping layer formed of part of the trapping layer in the downstream partition portion, satisfy $1.10 \leq A_s/B_s \leq 8.00$.

3. A method for manufacturing a honeycomb filter for trapping and removing solid components contained in a fluid, comprising:
a trapping layer forming step of forming a trapping layer in a honeycomb structure that includes a plurality of porous partition portions, the trapping layer being a layer for trapping and removing solid components contained in the fluid, each of the partition portions forming a cell that is open at one end and closed at the other end and serves as a flow path of a fluid;
an entire catalyst forming step of bringing the entire honeycomb structure into contact with a catalyst component to form a catalyst; and
a partial catalyst forming step of bringing only an upstream region of the honeycomb structure into contact with a catalyst component to form a catalyst,
wherein the amount of catalyst a within cells and on a surface of an upstream partition portion, which is formed of part of each of the partition portions on the upstream side of the cell, and the amount of catalyst b within cells and on a surface of a downstream partition portion, which is formed of part of each of the partition portions on the downstream side of the cell satisfy $1.05 \leq a/b \leq 3.00$, and
wherein at least part of the trapping layer is loaded with a catalyst, and the amount of catalyst A in an upstream trapping layer, which is formed of part of the trapping layer in the upstream partition portion, and the amount of catalyst B in a downstream trapping layer, which is formed of part of the trapping layer in the downstream partition portion, satisfy $1.08 \leq A/B \leq 5.00$.

4. A method for manufacturing a honeycomb filter for trapping and removing solid components contained in a fluid, comprising:
a trapping layer forming step of forming a trapping layer in a honeycomb structure that includes a plurality of porous partition portions, the trapping layer being a layer for trapping and removing solid components contained in the fluid, each of the partition portions forming a cell that is open at one end and closed at the other end and serves as a flow path of a fluid;
an upstream catalyst forming step of bringing only an upstream region of the honeycomb structure into contact with a catalyst component to form a catalyst; and a downstream catalyst forming step of bringing only a downstream region of the honeycomb structure into contact with a catalyst component to form a catalyst, the catalyst component having a lower concentration than the catalyst component for the upstream region, wherein the amount of catalyst a within cells and on a surface of an upstream partition portion, which is formed of part of each of the partition portions on the upstream side of the cell, and the amount of catalyst b within cells and on a surface of a downstream partition portion, which is formed of part of each of the partition portions on the downstream side of the cell, satisfy $1.05 \leqq a/b \leqq 3.00$, and wherein at least part of the trapping layer is loaded with a catalyst, and the amount of catalyst A in an upstream trapping layer, which is formed of part of the trapping layer in the upstream partition portion, and the amount of catalyst B in a downstream trapping layer, which is formed of part of the trapping layer in the downstream partition portion, satisfy $1.08 \leqq A/B \leqq 5.00$.

* * * * *